United States Patent
Matsumoto et al.

(10) Patent No.: US 11,527,813 B2
(45) Date of Patent: Dec. 13, 2022

(54) COMMUNICATION SYSTEM

(71) Applicant: DENSO CORPORATION, Kariya (JP)

(72) Inventors: Sho Matsumoto, Kariya (JP); Jungaun Lee, Kariya (JP); Youichi Hayase, Kariya (JP)

(73) Assignee: DENSO CORPORATION, Kariya (JP)

(*) Notice: Subject to any disclaimer, the term of this patent is extended or adjusted under 35 U.S.C. 154(b) by 20 days.

(21) Appl. No.: 17/213,505

(22) Filed: Mar. 26, 2021

(65) Prior Publication Data
US 2021/0305681 A1 Sep. 30, 2021

(30) Foreign Application Priority Data
Mar. 30, 2020 (JP) .............................. JP2020-060438

(51) Int. Cl.
*H01Q 1/24* (2006.01)
*H04B 3/52* (2006.01)
*H01M 10/42* (2006.01)
*H01Q 9/04* (2006.01)

(52) U.S. Cl.
CPC .......... *H01Q 1/243* (2013.01); *H01M 10/425* (2013.01); *H01Q 9/0414* (2013.01); *H01M 2010/4278* (2013.01)

(58) Field of Classification Search
CPC ............ H01Q 1/24; H01Q 1/243; H01Q 1/44; H01Q 9/0414; H04B 3/52; H04B 3/54; H04B 1/38; H04B 1/3822; H01M 10/42; H01M 10/425; H01M 2220/00; H01M 2010/4278
See application file for complete search history.

(56) References Cited

U.S. PATENT DOCUMENTS

| | | | |
|---|---|---|---|
| 2012/0196607 A1* | 8/2012 | Samardzija .......... | H04J 11/0053 455/450 |
| 2016/0087331 A1* | 3/2016 | Heppell ............... | H04B 5/0037 343/702 |
| 2019/0267680 A1* | 8/2019 | Toya ..................... | H02J 7/0013 |
| 2021/0168729 A1* | 6/2021 | Maki .................... | H04W 52/288 |
| 2021/0175942 A1* | 6/2021 | Maki ....................... | H04W 4/40 |
| 2021/0218071 A1* | 7/2021 | Aoki ..................... | H01M 50/204 |
| 2021/0218131 A1* | 7/2021 | Matsumoto ............ | H01Q 13/24 |

FOREIGN PATENT DOCUMENTS

JP 2016-012954 A 1/2016

* cited by examiner

*Primary Examiner* — Thai Pham
(74) *Attorney, Agent, or Firm* — Posz Law Group, PLC

(57) ABSTRACT

A communication system in a housing including a first communication device and a second communication device has, in at least one of the first communication device and the second communication device, an antenna structure installed at a position between a device arrangement surface and a specific surface. The housing has an inside member arranged substantially in parallel with a battery arrangement surface at a position at least one of above and below the antenna structure. The inside member has, formed thereon, at least one opening that opens in a vertical direction. The at least one of the first communication device and the second communication device serving as a specific communication device include an antenna having directivity set in a predetermined direction range including at least a direction in which the opening of the inside member is located.

16 Claims, 22 Drawing Sheets

⇐⇒ : RADIO WAVE

⇐ : RADIO WAVE

COMMUNICATION SYSTEM

CROSS REFERENCE TO RELATED APPLICATION

The present application is based on and claims the benefit of priority of Japanese Patent Application No. 2020-060438, filed on Mar. 30, 2020, the disclosure of which is incorporated herein by reference.

TECHNICAL FIELD

The present disclosure generally relates to a communication system provided inside a housing.

BACKGROUND INFORMATION

As a result of detailed study by the applicant, it has been found that if the housing is downsized and the height is reduced, wireless communication in the housing may become difficult. Due to downsizing and height reduction of the housing, for example, when the communication device is arranged perpendicular to the bottom surface of the housing, a gap between the antenna opening surface of the communication device and a member inside the housing facing the antenna opening surface is narrowed, which makes propagation of the radio wave difficult. The wireless communication mentioned here refers to wireless communication between plural communication devices in the housing.

SUMMARY

It is an object of the present disclosure to suppress difficulty in wireless communication in a housing in a communication system provided in the housing.

One aspect of the present disclosure is a communication system provided in a housing, the communication system including at least one first communication device and at least one second communication device different from the first communication device. The first communication device is configured to perform wireless communication and to receive battery information transmitted from the second communication device. The second communication device is configured to acquire, as the battery information, information about at least one battery cell in an assembled battery including plural battery cells, to perform wireless communication, and to transmit the battery information to the first communication device.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Hereinafter, exemplary embodiments of the present disclosure will be described with reference to the drawings. It should be noted that the term "parallel" as used below is not limited to being parallel in a strict sense, and may not be strictly parallel as long as the same effect as described above may be obtained. The same applies to the term "vertical" described below.

FIRST EMBODIMENT

1-1. Configuration

Figure 1:
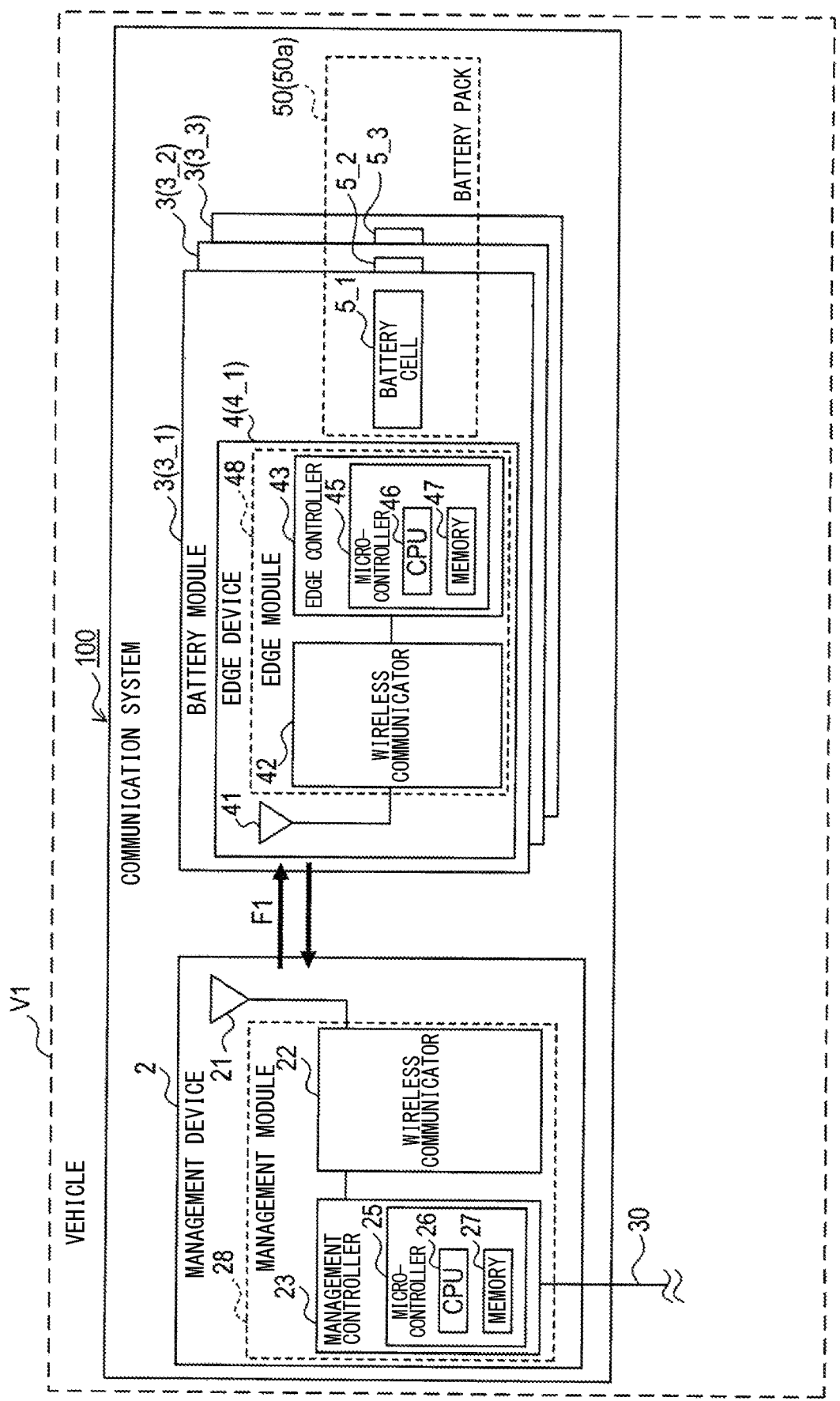
FIG. 1 is a block diagram showing a configuration of a communication system.

<Overall Configuration, FIG. 1>

The configuration of a communication system 100 according to the present embodiment will be described with reference to FIG. 1. The communication system 100 is mounted on a vehicle VEH. The communication system 100 includes at least one management device 2 and plural edge devices 4 different from the management device 2. The communication system 100 may include at least one assembled battery 50. The assembled battery 50 is formed by packaging plural battery cells 5. A single battery cell 5 is constituent unit of a battery.

In the present embodiment, the communication system 100 includes one management device 2 and three battery modules 3 as shown in FIG. 1. Further, the communication system 100 includes one assembled battery 50, and the assembled battery 50 includes three battery cells 5 (wherein each battery cell 5 is associated with one respective battery module 3). However, the number of management devices 2 included in the communication system 100, the number of edge devices 4, and the number of battery cells 5 are not limited to the above.

Hereinafter, a battery module 3 includes one edge device 4 and at least one battery cell 5. In the present embodiment, as shown in FIG. 1, an example in which the battery module 3 includes one edge device 4 and one battery cell 5 will be described. However, the number of the battery cells 5 included in the battery module 3 is not limited to the above. The number of battery cells 5 included in the battery module 3 may be plural. The number of battery cells 5 included in each of the battery modules 3 may be different for each battery module 3. In the present embodiment, the battery cells 5 included in the assembled battery 50 are connected in series with each other. However, the battery cells 5 may be connected in parallel, or may be connected in series-parallel.

In the following, the individual component among the plurality of components included in the communication system 100 may be represented by adding suffixes to the reference numerals, such as an edge device 4_1 and a battery module 3_1. In addition, when describing a common description about each component, a suffix is omitted and only a numeral is described like the edge device 4 and the battery module 3, for example.

<Management Device 2, FIG. 1>

The management device 2 includes an antenna 21, a wireless communicator 22, and a management controller 23. The wireless communicator 22 and the management controller 23 are also referred to as a management module 28.

In the present embodiment, the antenna 21 is configured as a planar antenna having directivity in all directions. The configuration of the antenna 21 is not limited to the above. The wireless communicator 22 communicates with the edge devices 4 provided respectively in each of the battery modules 3 via the antenna 21 in a predetermined frequency band (hereinafter, may also be designated as "used frequency band") F1 used in the communication system 100 for sending and receiving wireless communication signals. The used frequency band F1 is a frequency band used for wireless communication in the communication system 100, and may be, for example, the ISM band (i.e., several GHz).

The management controller 23 includes a microcontroller 25 including a CPU 26, a ROM, a RAM, and a semiconductor memory (hereinafter, memory) 27 such as a flash memory. The management controller 23 realizes various functions by the CPU 26 executing a program stored in the memory 27.

For example, the management controller 23 uses the wireless communicator 22 to perform wireless communication with the edge device 4, which is a target device. Specifically, the management controller 23 transmits a transmission instruction signal to the edge device 4, causes the edge device 4 to transmit battery information acquired by the edge device 4, and stores the battery information in the memory 27.

The battery information is information about the assembled battery 50, such as the voltage of the assembled battery 50 and the temperature of the assembled battery 50. The battery information may be information on the assembled battery 50 itself and/or may include information on each battery cell 5 constituting the assembled battery 50. In the present embodiment, the edge device 4 acquires the voltage of the battery cell 5 included in the battery module 3 as the battery information and transmits the battery information to the management device 2.

When the battery module 3 includes plural battery cells 5, the voltage of each of the plural battery cells 5 may be acquired as battery information and the battery information may be transmitted to the management device 2.

The management controller 23 may output the battery information stored in the memory 27 to an external device of the communication system 100 via a communication line 30. The external device may be, for example, an electronic control device included in the vehicle V1.

<Edge Device 4, FIG. 1>

The edge devices 4 included in the communication system 100 are similarly configured to each other. One edge device 4 includes an antenna 41, a wireless communicator 42, and an edge controller 43. The wireless communicator 42 and the edge controller 43 are also referred to as terminal modules.

In the present embodiment, the antenna 41 is configured as a horn antenna. However, the configuration of the antenna 21 is not limited to the above. The directivity of the antenna 41 will be described later. The wireless communicator 42 transmits/receives a wireless communication signal to/from the management device 2 via the antenna 41. The wireless communicator 42 may be configured similarly to the wireless communicator 22.

The edge controller 43 includes a microcontroller 45 including a CPU 46 and a memory 47. The edge controller 43 realizes various functions by the CPU 46 executing programs stored in the memory 47.

For example, the edge controller 43 acquires the battery information at a predetermined cycle and stores it in the memory 47. Further, the edge controller 43 transmits the battery information to the management device 2 according to the transmission instruction signal transmitted from the management device 2. In the present embodiment, as described above, the edge controller 43 acquires the voltage of the battery cell 5 included in the battery module 3 including the edge device 4 as the battery information, and transmits the battery information to the management device 2 according to the transmission instruction signal.

Figure 2:
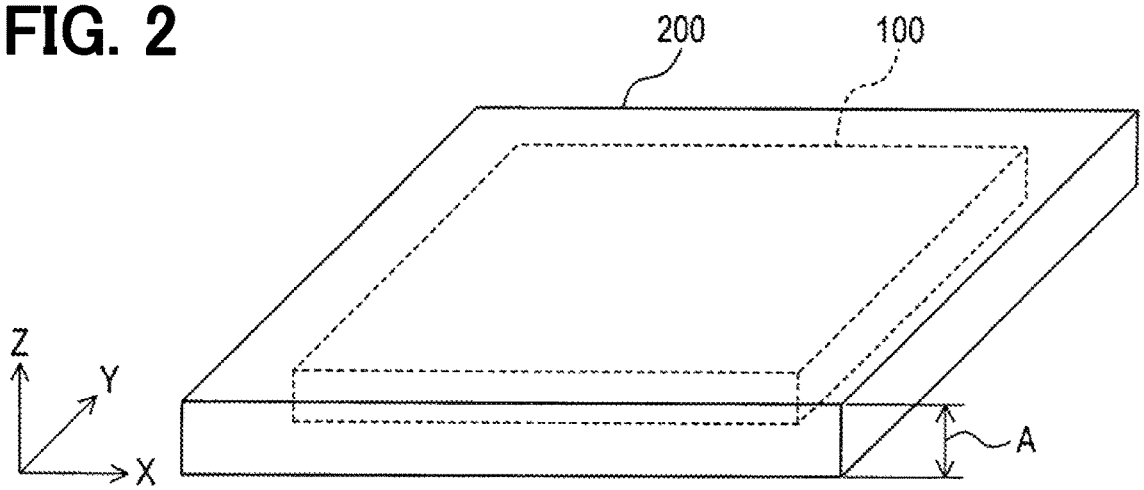
FIG. 2 is a perspective view showing an appearance of a housing.
Figure 3:
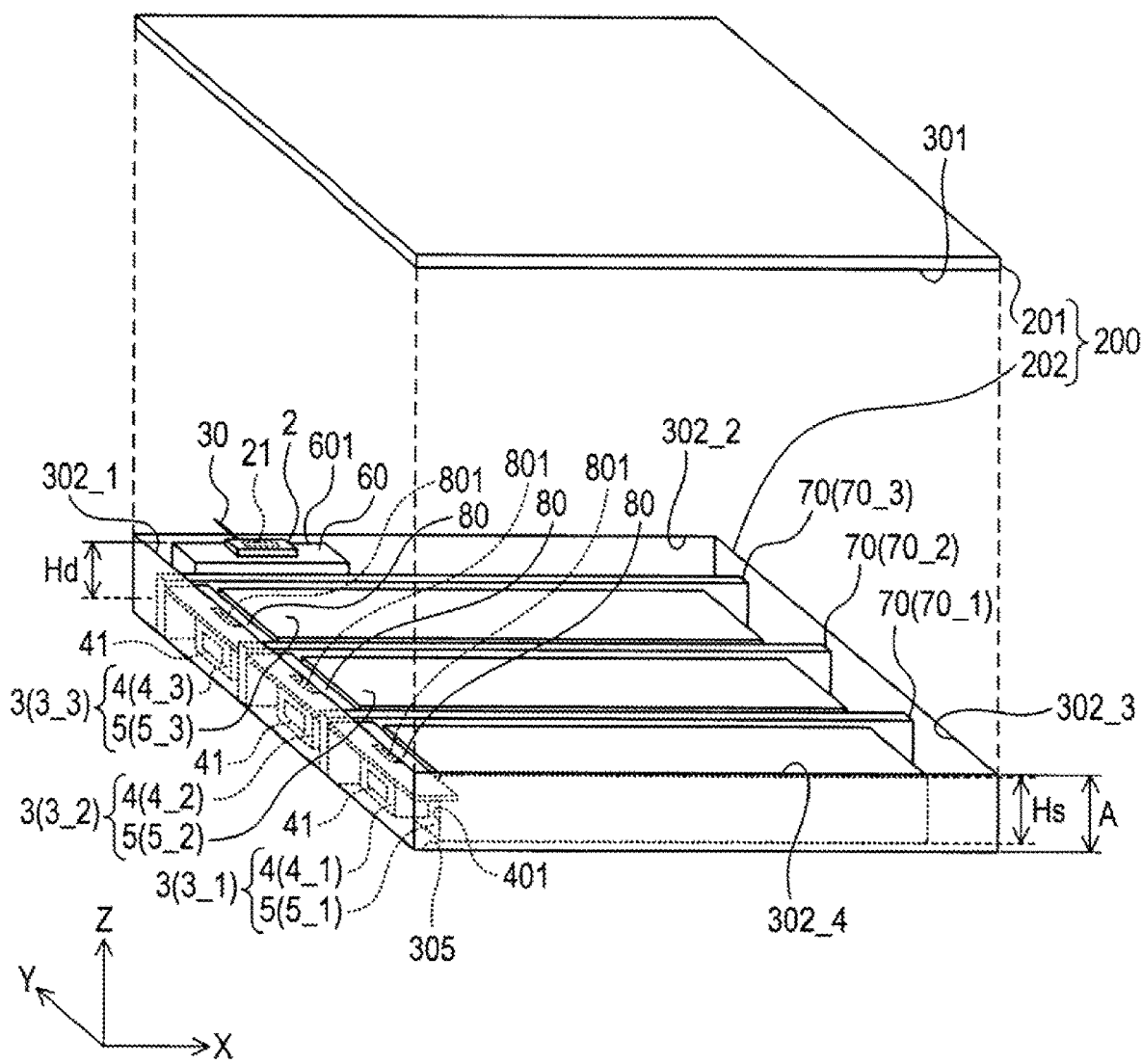
FIG. 3 is a perspective view of a housing and a communication system according to a first embodiment.

<Assembled Battery 50, FIGS. 1, 2, 3>

The assembled battery 50 includes the three battery cells 5 (i.e., the battery cells 5_1-5_3) as described above. The battery cells 5_1-5_3 have the same shape. The battery cell 5 is formed in a hexahedral (six sided) shape, for example, as shown in FIG. 3 described later. However, the shape of the battery cell 5 is not limited to the above and may be any shape.

The height (i.e., thickness) of the battery cell 5 is Hs. The battery cell 5 is provided with an electrode (not shown). The electrodes provided in each of the battery cells 5 included in the assembled battery 50 are connected by wiring (not shown) so that the assembled battery 50 may be energized.

The assembled battery 50 supplies electric power to a load (not shown) provided outside the communication system 100.

<Configuration in the Housing 200, FIGS. 2, 3>

As shown in FIG. 2, for example, the communication system 100 is arranged in a rectangular parallelepiped metal housing 200 installed in the vehicle V1. As shown in FIG. 3, the housing 200 includes a lid portion 201 formed in a flat plate shape and a bottom portion 202 formed in a box shape. In the following description, the left-right direction on the paper/drawing surface is the X direction, the depth direction relative to paper/drawing surface is (substantially) the Y direction, and the up-down direction on the paper/drawing surface is the Z direction. The up-down (vertical) direction corresponds to a height direction of the housing 200. The upward direction is the +Z direction, and the downward direction is the −Z direction.

The housing 200 is downsized and the height is reduced. The reduction in height means that the thickness of the housing 200 in the +Z direction, that is, a height A is formed to be relatively small. The battery cell 5 is arranged on the bottom portion 202 of the housing 200. A battery arrangement surface 305 described below refers to a surface (of the bottom portion 202) on which the battery cells 5 are arranged.

The battery cells 5 are arranged on the battery arrangement surface 305 along at least one of the first direction (i.e., the X direction) and the second direction (i.e., the Y direction). The first direction is the X direction in the present embodiment, of FIG. 3, wherein a single battery extends with its longest dimension in the +X direction. The second direction is the Y direction in the present embodiment and is a direction perpendicular to the first direction. In the present embodiment, the battery cells 5_1-5_3 are arranged in alignment along the Y direction (forming a physical series in the Y direction).

The housing 200 includes reinforce members 70 (also known as a reinforcement). The reinforce members 70 extend in the X direction, and connects inner peripheral wall surfaces 302_1 and 302_3 facing each other. The inner peripheral wall surfaces 302 are wall surfaces on an inner periphery of the housing 200 that extend in the up-down direction (i.e., the vertical direction). In the present embodiment, as shown in FIG. 3, an inner peripheral wall surface 302_1 and an inner peripheral wall surface 302_3 face each other, and the reinforce members 70 connect them. The reinforce members 70 include: 70_1, 70_2, and 70_3. The reinforce member 70_1 is arranged at a position between the battery cell 5_1 and the battery cell 5_2. The reinforce member 70_2 is arranged at a position between the battery cell 5_2 and the battery cell 5_3, and the reinforce member 70_3 is arranged at a position between the battery cell 5_3 and a pedestal 60 described later.

The reinforce member 70 is formed in a flat plate shape. Although not shown, for example, an L-shaped member or the like fixes one end of the reinforce member 70 in the longitudinal direction to the inner peripheral wall surface 302_1 and the other end to the inner peripheral wall surface 302_3, forming a corner brace.

The present embodiment is not limited to the above. The reinforce member 70 may be fixed to the inner peripheral wall surface 302 by a member having an appropriate shape other than the L-shape. Further, the reinforce member 70 may have any plate-like shape instead of the flat plate shape. The plate-shaped portion may have any thickness. Further, the reinforce member 70 may have an end portion appropriately formed in any shape that is easily fixable to the inner peripheral wall surface 302. The end portion of the reinforce member 70 may be formed in an L shape or the like, for example. However, the shape of the end portion is not limited to the above.

By providing the reinforce member 70, the housing 200 can maintain its shape even when a force is applied from the outside. Namely, the battery cells 5 arranged inside may be protected more reliably.

For example, in the present embodiment, the material of the reinforce member 70 is metal. However, the present disclosure is not limited to the above. The material of the reinforce member 70 may include a metal and a material other than metal such as resin. The material of the reinforce member 70 may also be a material other than metal, such as resin. Further, the reinforce member 70 may be made of yet other material.

In FIG. 3, the management device 2 is arranged along the inner peripheral wall surface 302. "Along" as used herein can mean that the management device 2 and the surface 302 are substantially parallel with each other. For example, in the present embodiment, the management device 2 is arranged along the inner peripheral wall surface 302_2, which is one of the inner peripheral wall surfaces 302. Specifically, the pedestal 60 is arranged along the inner peripheral wall surface 302_2, and the management device 2 is arranged on an upper surface 601 of the pedestal 60. The management device 2 includes the antenna 21. Namely, the antenna 21 is installed at a position between (i) a surface 301 on a downside of the lid portion 201, i.e., one of the wall surfaces of the housing 200, and (ii) the upper surface 601 of the pedestal 60.

Note that, in the present embodiment, a height Hd of the pedestal 60 is lower than the height A of the housing 200, and, though not shown, a gap between an outer shell of the antenna 21 and the surface 301 may be less than a wavelength λ of the radio wave of the used frequency band F1. However, the present disclosure is not limited to the above. The gap between the outer shell of the antenna 21 and the surface 301 may be equal to or longer than the wavelength λ of the radio wave in the used frequency band F1.

On the other hand, the edge device 4 is installed on the orthogonal surface in the housing 200. The orthogonal surface is a surface orthogonal to the battery arrangement surface 305. For example, in the present embodiment, the edge device 4 is arranged on the orthogonal surface of the battery cell 5 included in the battery module 3 including the edge device 4. In the following, the orthogonal surface on which the edge device 4 is installed is also referred to as a device arrangement surface. Namely, the device arrangement surface is an arbitrary orthogonal surface on which the specific communication device (i.e., the edge device 4 in the present embodiment) is installed. In the present embodiment, as shown in FIG. 3, an orthogonal surface 401, which is an orthogonal surface of the battery cell 5 facing the inner peripheral wall surface 302_1, is the device arrangement surface, and may be arbitrarily defined as the front surface, located at the −X end of the battery cell 5. Also, +Y is the left direction, −Y is the right direction, and +X is the rear or back direction. These are the intuitive terms for a reader viewing FIG. 3.

When the battery module 3 includes one edge device 4 and plural battery cells 5, an orthogonal surface included in at least one battery cell 5 among the plurality of battery cells 5 may be used as a device arrangement surface. The specific communication device described below means a device that is arranged on an orthogonal surface and that includes at least an antenna structure. The antenna structure includes at least one antenna. Namely, the antenna structure may be a single antenna, plural antennas, or may include one or more antennas and other structures. Other structures may include, for example, a connection line, a microstrip line formed on a substrate, a module for performing wireless communication, a module housing 51 described later, an antenna cover 52, a substrate 53, and the like.

Further, the specific surface mentioned below is an orthogonal surface different from the device arrangement surface on which the specific communication device is installed. The antenna structure of the specific communication device is installed at a position between the specific surface and the device arrangement surface. For example, in the present embodiment, the (front) inner peripheral wall surface 302_1 corresponds to a specific surface. Namely, the antenna structure including the antenna 41 included in the edge device 4 as the specific communication device is installed at a position between the inner peripheral wall surface 302_1 serving as the specific surface and the orthogonal surface 401 serving as the device arrangement surface.

As shown in FIG. 3, the edge devices 4 are arranged along a direction in which the device arrangement surface extends (i.e., along a longitudinal (left-right) direction of the orthogonal surface 401) which bears the edge devices 4 arranged thereon (i.e., the Y direction in the present embodiment). For example, in the present embodiment, the direction in which the edge devices 4 are arranged side by side is equal to the direction in which the battery cells 5 are arranged side by side. Further, the edge devices 4 are arranged at relatively lower positions on the device arrangement surface.

Figure 4:
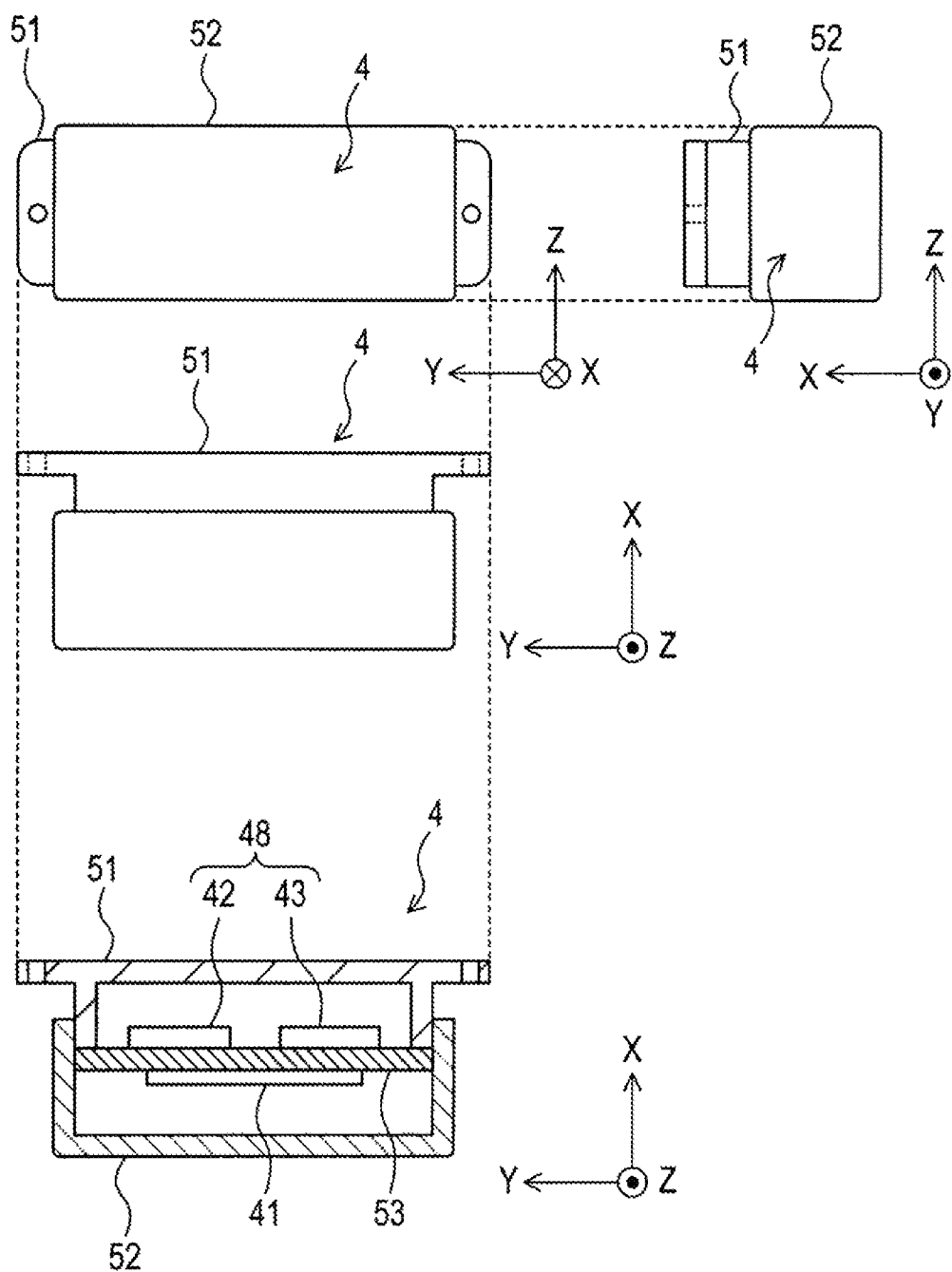
FIG. 4 is a trihedral view and a cross-sectional view of an edge device 4.

For example, as shown in FIG. 4, the edge device 4 includes the module housing 51, the antenna cover 52, and the substrate 53, and, on one surface of the substrate 53, the antenna 41 is formed, and, on the other surface of the substrate 53, an edge module 48 is formed. The substrate 53 is supported by the module housing 51, and the surface of the substrate 53 on which the antenna 41 is formed is covered with the antenna cover 52. The module housing 51 may be made of metal, for example. The antenna cover 52 may be formed of a material that can transmit radio wave (i.e., a radio wave permeable material). Examples of the material that can transmit radio wave include a resin, but the material is not limited to the resin.

Namely, on the device arrangement surface, (i) the edge module 48 formed on the substrate 53 and (ii) the antenna 41 formed on the opposite surface of the edge module 48 via the substrate 53 are arranged. The antenna structure including the antenna 41 (i.e., the edge device 4 itself in the present embodiment) is arranged at a position between the device arrangement surface (i.e., the orthogonal surface 401, also known as the front face of the battery cell 5) and the inner peripheral wall surface 302_1 serving as the specific surface. In the present embodiment, a gap Gf (see FIG. 9) between the outer shell of the antenna 41 and the inner peripheral wall surface 302_1 as the specific surface may hinder radio wave propagation if it is less than the wavelength λ of the radio wave in the used frequency band F1. However, the present disclosure is not limited to the above. The gap Gf between the outer shell of the antenna 41 and the inner peripheral wall surface 302_1 may be equal to or longer than the wavelength λ of the radio wave in the used frequency band F1 to facilitate propagation.

Figure 5:
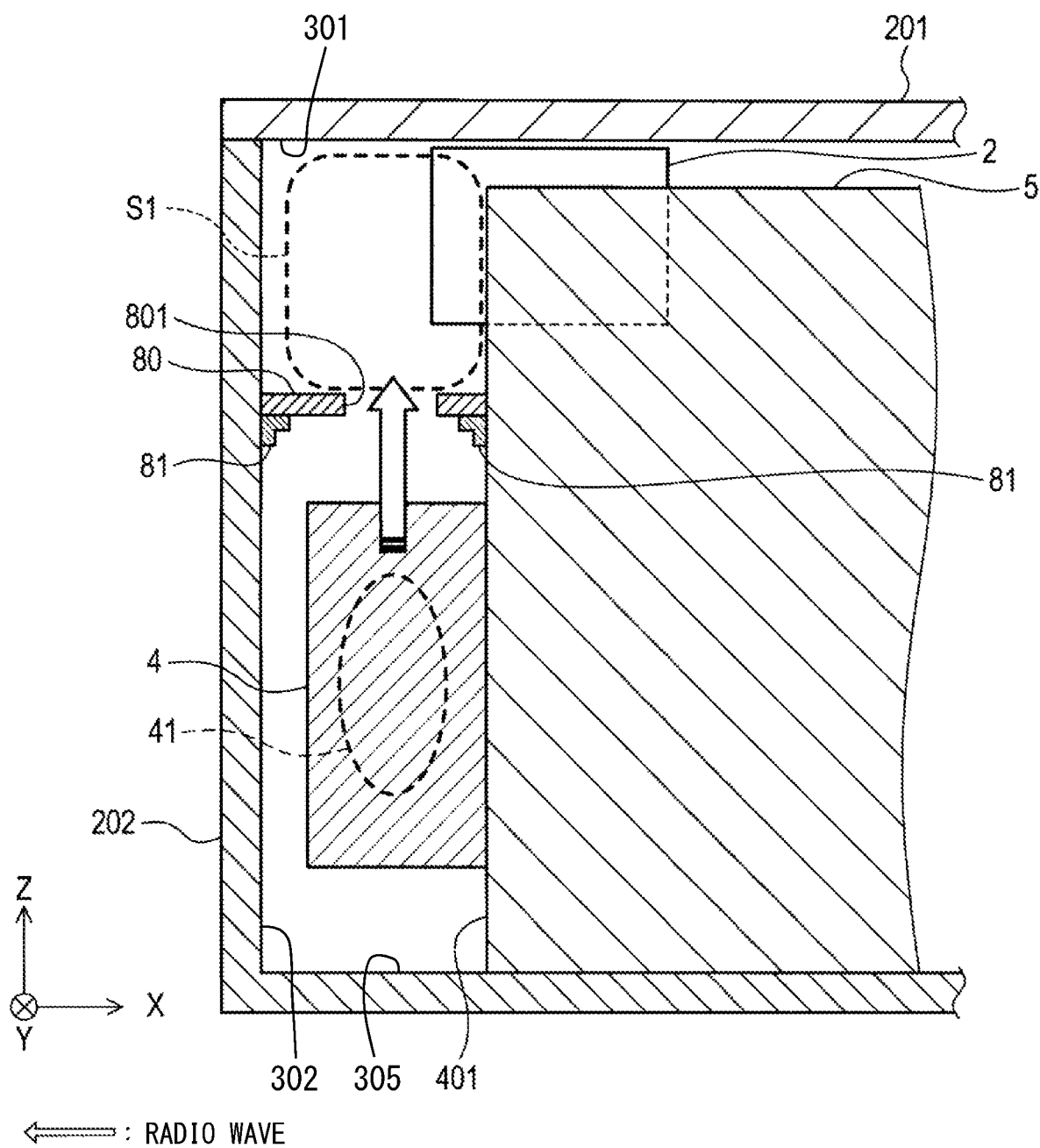
FIG. 5 is an explanatory diagram illustrating directivity of an antenna included in the edge device and propagation of radio wave.

The housing 200 includes at least one inside member 80. The inside member 80 is a member that is arranged, for each specific communication device, at least one of above and below of the antenna structure included in the specific communication device, on condition that above and/or below indicates a vertical direction orthogonal to the battery arrangement surface 305. The inside member 80 may be installed parallel to the battery arrangement surface 305. However, the inside member 80 does not necessarily have to be installed parallel to the battery arrangement surface 305. In FIG. 5, the inside member 80 is similar to a bookshelf resting on top of brackets.

For example, in FIG. 4, the antenna structure included in the edge device 4 is: the module housing 51, the antenna cover 52, the substrate 53, the antenna 41, and the edge module 48). The outer shell of the antenna structure included in the edge device 4 corresponds to an outer shell of the edge device 4 (i.e., the outer shell of the module housing 51 and the antenna cover 52).

The inside member 80 is arranged above the antenna structure of the edge device 4. Namely, the inside members 80 are individually arranged above the antenna structures included in the edge devices 4_1-4_3. In the present embodiment, the inside member 80 is installed parallel to the battery arrangement surface 305.

The inside member 80 is a member for connecting and fixing the device arrangement surface (i.e., the orthogonal surface 401, the front face of the battery cell 5) and the specific surface. For example, in the present embodiment, the inside member 80 connects and fixes the battery cell 5 including the device arrangement surface and the inner peripheral wall surface 302_1 as the specific surface. Thereby, the movement of the battery cell 5 in the housing 200 may be suppressed.

The shape of the inside member 80 may be any shape. For example, in the present embodiment, the inside member 80 is formed in a rectangular plate shape. One of the end portions of the inside member 80 is fixed to the device arrangement surface, and the other thereof is fixed to the specific surface.

For fixing, for example, an L-shaped attachment member 81 or the like may be used. The fixing mode is not limited to the above. The inside member 80 may be fixed to the device arrangement surface and the specific surface by an attachment member 81 having an appropriate shape other than the L-shape. Further, the inside member 80 may have any plate-like shape instead of the flat plate shape. The plate-shaped portion may have any thickness. Further, the inside member 80 may have an end portion appropriately formed in a shape that is easily fixable to the device arrangement surface and the specific surface. The end portion may be formed, for example, like an L shape or the like. However, the shape of the end portion is not limited to the above.

In the present embodiment, the material of the inside member 80 is metal. A space S1 is formed above the inside member 80, and extends in a direction in which the plurality of edge devices 4 are arranged (i.e., in +Y direction in the present embodiment).

The space S1 here is a space defined/surrounded by the inside member 80, the inner peripheral wall surface 302_1 (see FIG. 9), the lid portion 201 (i.e., the surface 301, see FIG. 3), and a surface extending from the device arrangement surface (i.e., the orthogonal surface 401, see FIG. 5) in the +Z direction. Among these surfaces, the inside member 80, the inner peripheral wall surface 302_1, and the lid portion 201 are made of metal. Namely, the space S1 is mainly surrounded by metal (i.e., relatively large amount of the wall surrounding S1 is metal).

In the space S1 mainly surrounded by metal, an effect similar to a waveguide occurs when a radio wave propagates. The effect similar to the waveguide means that radio wave can propagate along the space. The space S1 acts like a waveguide in the upward direction, as shown by the radio wave arrow in FIG. 5. Hereinafter, such a space S1 is referred to as a pseudo waveguide space S1 (or PWG space S1 for brevity).

The material of the inside member 80 is not limited to the above. The inside member 80 may be made of metal and a material other than metal, such as resin. The material of the inside member 80 may be a material other than metal, such as resin or the like.

Figure 6:
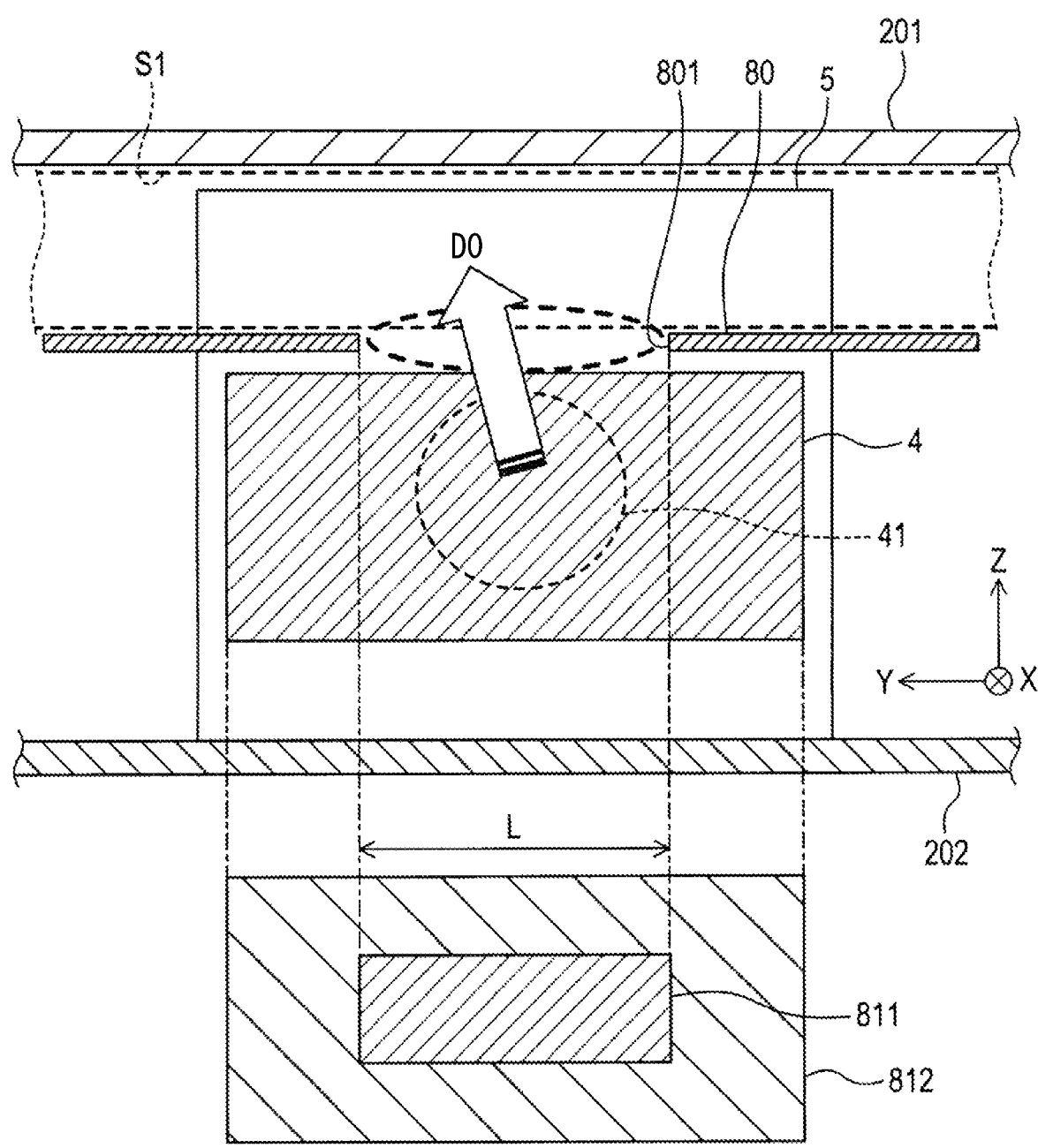
FIG. 6 is another explanatory diagram illustrating directivity of an antenna included in the edge device and propagation of radio wave.

Then, as shown in FIGS. 5 to 6, an opening 801 is formed on the inside member 80. The opening 801 is a through hole formed on the inside member 80, and opens in the vertical direction on the inside member 80 inside the housing 200.

As shown in FIG. 6, the opening 801 is formed such that an opening projection area 811 overlaps an antenna projection area 812. The opening projection area 811 is an area in which the opening 801 is projected from above along the vertical direction toward the battery arrangement surface 305. The antenna projection area 812 is an area in which the antenna structure included in the edge device 4 as the specific device (i.e., the edge device 4 itself in the present embodiment) is projected from above along the vertical direction toward the battery arrangement surface 305.

The overlap between the opening projection area 811 and the antenna projection area 812 is referred to as an overlap area. For example, in the present embodiment, as shown in FIG. 6, the overlap area is equal to the opening projection area 811. Namely, the entire opening projection area 811 overlaps the antenna projection area 812. The present disclosure is not limited to the above. For example, a part of the opening projection area 811 may overlap the antenna projection area 812. Namely, a structure where at least a part of the opening projection area 811 overlaps the antenna projection area 812 may suffice.

The opening 801 is formed in a rectangular shape as shown in FIGS. 3, 6 and the like. However, the shape of the opening 801 is not limited to the above, and may be formed as a circle, an ellipse, various polygons, and any other shape.

Note that it has been confirmed by experiments that the longest length L of the opening 801 is preferably λ/4 or more. It has also been confirmed by experiments that the longest length of the opening 801 is preferably less than λ (i.e., less than one wavelength).

$$(\lambda/4) \leq L < \lambda \qquad \text{Equation 1 (preferred):}$$

In the present embodiment, the long side of the rectangular opening projection area 811 has a length of λ/4. However, the present disclosure is not limited to the above, and the length of the longest portion of the opening 801 may be any length.

Then, the antenna 41 included in the edge device 4 as the specific communication device has directivity set in a certain range of direction, i.e., in a range including at least a direction in which the opening 801 of the inside member 80 is located when viewed from the edge device 4, as shown in FIGS. 5 to 8. The inside member 80 referred to here is the inside member 80 located above the device arrangement surface on which the respective edge devices 4 having the antenna 41 are arranged (i.e., the inside member 80 located immediately adjacent to each edge device 4).

Figure 7:
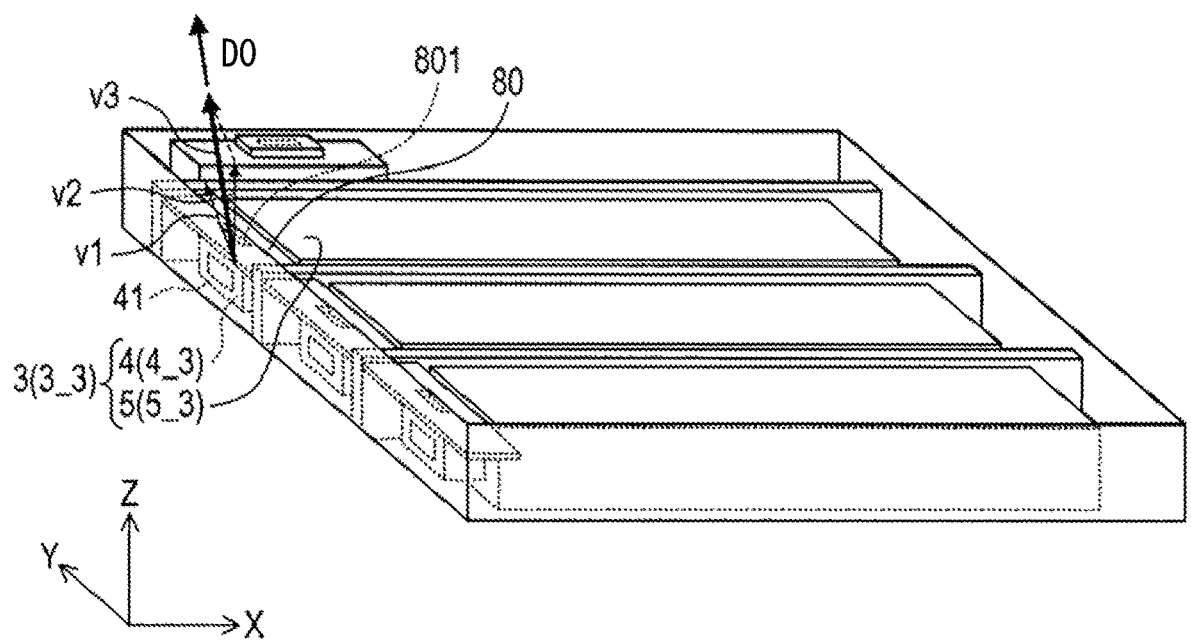
FIG. 7 is yet another explanatory diagram illustrating directivity of an antenna included in the edge device.
Figure 9:
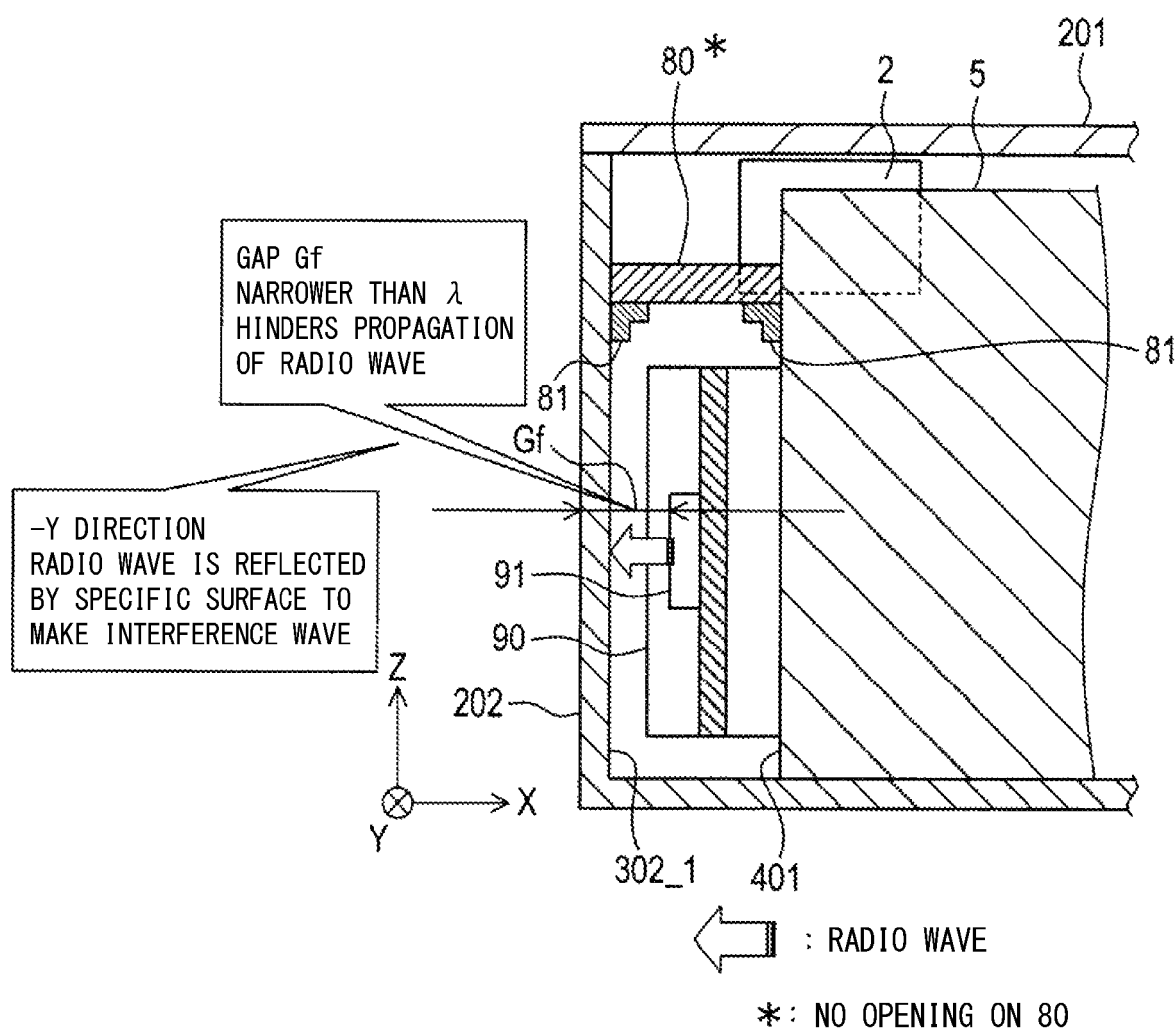
FIG. 9 is an explanatory diagram illustrating propagation of radio wave by a comparison device.

In the present embodiment, the management device 2 is arranged on the pedestal 60 located along the inner peripheral wall surface 302_2, and is located at a relatively upper position in the housing 200 (see FIGS. 3, 7, and 9). In other words, the management device 2 is leftward of the edge devices, and above the edge devices.

Figure 8:
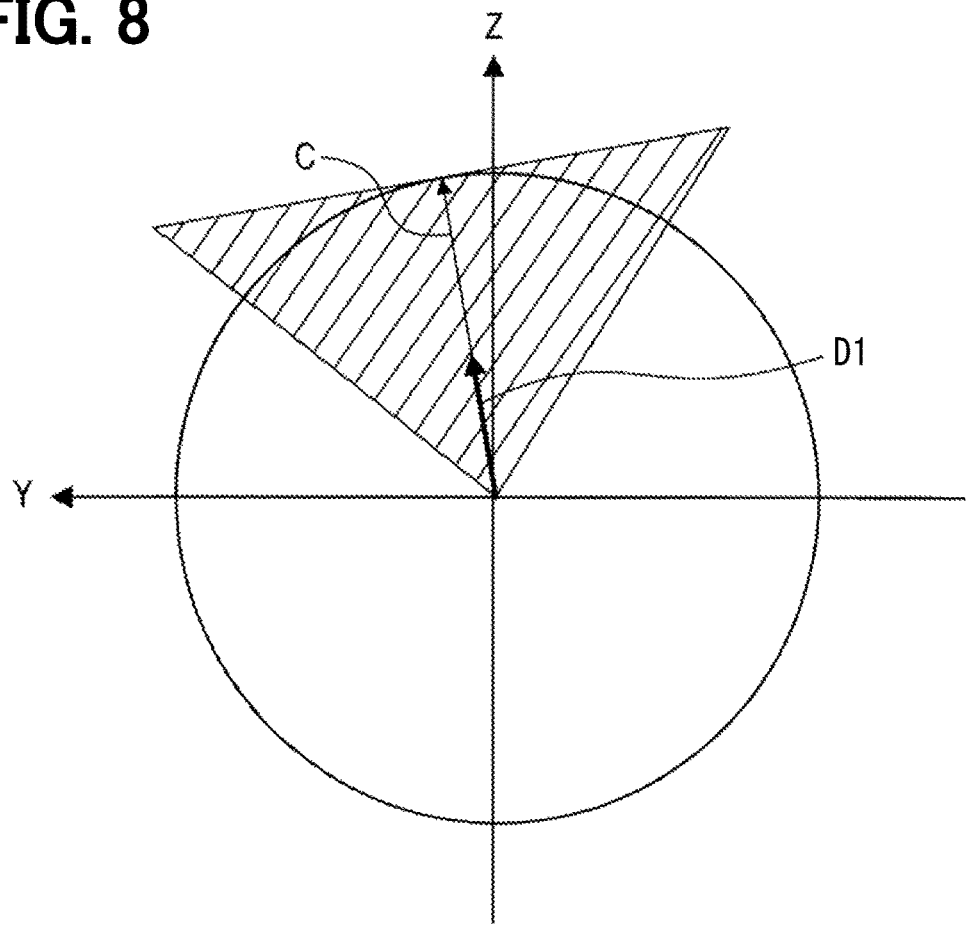
FIG. 8 is still yet another explanatory diagram illustrating directivity of an antenna included in the edge device.

In FIGS. 7 and 8, the directivity of the antenna 41 is set in a predetermined direction range including a direction slightly deviated leftward towards the management device 2. The predetermined range including a direction slightly deviated toward the management device direction includes a direction in which the opening 801 is located when viewed from the edge device 4. The range of direction described above includes a direction in which the management device 2 is located.

A deviated-toward management device direction D0 (also known as a deviated direction) described below is a direction slightly deviated toward the management device 2. The deviated-toward management device direction D0 is, specifically, a direction of a combined vector v3 which is a combination of: (i) a unit vector v1 directed in the direction in which the inside member 80 is located when viewed from the edge device 4 and (ii) a unit vector v2 directed in the management device direction, among the upward direction and the downward direction. In the present embodiment, the unit vector v1 is in the upward direction. The unit vectors v1 and v2 are vectors having a predetermined size. These unit vectors may be non-orthogonal with respect to the X-direction (in other words, they may have X components). Further, the combined vector v3 may be a weighted combination of v1 and v2.

For example, as shown in FIG. 8, a central axis C of the directivity of the antenna 41 provided as a horn antenna may be configured as (i.e., oriented in) a direction that matches a projection direction D1, which is a projection of the deviated-toward management device direction D0 (i.e., the direction of the combined vector v3) onto the Y-Z plane. The directivity of the antenna 41 is not limited to the above. In other words, projection direction D1 is the portion of v3 that is orthogonal to the X direction (a projection onto the ZY plane). The antenna is oriented such that the central axis C is coaxial with the D1 direction.

1-2. Operation

In the communication system 100, the radio wave transmitted from the antenna 41 may be injected into the pseudo waveguide space S1 through the opening 801 and may propagate along the pseudo waveguide space S1. Similarly, the radio wave propagating in the pseudo waveguide space S1 may be received by the antenna 41 through the opening 801.

Here, as a comparative example (not preferred), as shown in FIG. 9, a wireless communication device for comparison (hereinafter, a comparison device 90) arranged in the housing 200 of the present embodiment is described instead of the edge device 4, for a consideration. The comparison device 90 includes an antenna 91 having an opening on the YZ plane and having directivity set in the −X direction (frontward, through the opening). Although not shown, plural comparison devices 90 are arranged on the device arrangement surface (i.e., the orthogonal surface 401) of the battery cell 5. Namely, like the edge device 4, plural comparison devices 90 are arranged side by side in the Y direction in which the battery cells 5 are arranged. The gap Gf between the antenna 91 and the inner peripheral wall surface 302_1 is relatively narrow (less than λ). No opening 801 is formed on the inside member 80.

In such a comparative example, propagation of radio wave becomes difficult in the −X direction due to the influence of reflection by the inner peripheral wall surface 302_1. When the above-mentioned gap Gf is less than the wavelength λ of the radio wave used for wireless communication, the propagation of the radio wave becomes more difficult. In the Y direction, another comparison device 90 different from the subject comparison device 90 may be arranged in a relatively narrow space, which may serve as an obstacle, making it difficult to propagate radio wave. In the Z direction, the comparison device 90 is close to the inside member 80 that does not have the bottom portion 202 and the opening 801, making it difficult to receive radio wave. Namely, in the comparison device 90, it becomes difficult for the radio wave to propagate in any direction.

On the other hand, in the communication system 100, as described above, radio wave propagates between the edge device 4 and the management device 2 via the pseudo waveguide space S1. In particular, by using the antenna 41 of the present embodiment, since radio wave is transmitted and received through the opening 801 in a predetermined direction range including the deviated-toward management device direction D0, the propagation of radio wave through the pseudo waveguide space S1 is made easier.

1-3. Effects

According to the first embodiment described in detail above, the following effects are achievable.

(1a) The housing 200 includes the inside member 80 inside the housing 200. The inside member 80 is a plate-like member, which is installed substantially parallel to the battery arrangement surface 305 on at least one of above and below the antenna 41 included in the edge device 4 as a specific communication device, on condition that above and/or below indicates a vertical direction orthogonal to the battery arrangement surface 305. In the present embodiment, the inside member 80 is installed above the antenna 41.

The inside member 80 is formed with the opening 801 that opens in the vertical direction. The antenna 41 included in the edge device 4 that is the specific communication device is directed to a predetermined range including at least the direction in which the opening 801 of the inside member 80 is located when viewed from the antenna structure (i.e., from the edge device 4).

As a result, the radio wave propagates through the opening 801 to/from the edge device 4 in the housing 200 that is downsized and is reduced in height and that includes the inside member 80. Therefore, it is possible to suppress difficulty of wireless communication in the housing 200. As a result, in the communication system 100, the management device 2 can receive the battery information with a higher communication success probability from the edge device 4 that is a device that acquires and transmits the battery information.

(1b) The inside member 80 is configured to fix the device arrangement surface (i.e., the orthogonal surface 401 in the present embodiment) and the specific surface. For example, in the present embodiment, the battery cell 5 that is a member including the device arrangement surface and the bottom portion 202 are fixed. As a result, in the housing 200, radio wave is enabled to propagate between the management device 2 and the edge device 4 through the opening 801, and movement of the battery cells 5 in the housing 200 is suppressible.

(1c) The antenna 41 included in the edge device 4 has directivity set in a predetermined direction range including the direction in which the opening 801 of the inside member 80 is located and the direction in which the management device 2 is located. In particular, in the present embodiment, directivity of the antenna 41 is set in a predetermined direction range including (i) the direction in which the opening 801 of the inside member 80 arranged above the device arrangement surface (i.e., the orthogonal surface 401) is located and (ii) the management device direction. The range described above may be a predetermined range including the deviated-toward management device direction D0. Thereby, in the housing 200, the radio wave is enabled to propagate more reliably between the management device 2 and the edge device 4 via the opening 801. As a result, in the housing 200, it is possible to perform wireless communication between the management device 2 and the edge device 4 with a higher communication success probability.

(1d) The longest length/dimension of the opening 801 is not less than ¼ of the wavelength λ of the radio wave used in the communication system 100 and less than one wavelength. As a result, the radio wave easily passes through the opening 801, so that the radio wave is enabled to more easily propagate between the management device 2 and the edge device 4 through the opening 801. As a result, wireless communication may be performed in the housing 200 with a higher communication success probability.

(1e) The device arrangement surface is one of plural orthogonal surfaces included in the battery cell 5. As a result, the edge device 4 is not stacked on the battery cells 5 in the height direction but is arranged on the side surface of the battery cells 5, so that the housing 200 can have a low profile/is reduced in height.

(1f) The specific surface is the inner peripheral wall surface 302 of the housing 200 (i.e., the inner peripheral wall surface 302_1 in the present embodiment). As a result, the inside member 80 fixes the orthogonal surface 401 of the battery cell 5 as the device arrangement surface and the inner peripheral wall surface 302 as the specific surface. As a result, the movement of the battery cell 5 in the housing 200 is more reliably suppressible.

(1g) The management device 2 may be arranged along the inner peripheral wall surface 302 of the housing 200. Such a structure facilitates the connection of the management device 2 to the electronic control device or the like outside the housing 200 via the communication line 30.

(1h) The gap Gf between the outer shell of the antenna structure included in the edge device 4 and the inner peripheral wall surface 302_1 that is the specific surface may be smaller than the wavelength λ of the radio wave used for wireless communication. Also in such case, in the present embodiment, the radio wave may propagate between the management device 2 and the edge device 4 through the opening 801 using the pseudo waveguide space S1. As a result, the gap Gf is reduced for downsizing of the housing 200, and it is still possible to suppress difficulty of wireless communication within the housing 200.

(1i) The opening 801 is formed so that the opening projection area 811 overlaps the antenna projection area 812. The opening projection area 811 is an area in which the opening 801 is projected from above toward the battery arrangement surface 305. The antenna projection area 812 is an area in which the antenna structure provided in the specific communication device (i.e., the edge device 4 in the present embodiment) is projected from above toward the battery arrangement surface 305. In such manner, it is possible to set the directivity of the antenna 41 toward the opening 801 by orienting the directivity of the antenna 41 substantially/roughly upward, which makes it easy to configure the antenna 41.

(1j) In the housing 200, a space surrounded by the specific surface, the inside member 80, the lid portion 201, and the device arrangement surface is positioned/defined in the direction in which the inside member 80 is located when viewed from the edge device 4 (i.e., above the edge device 4), which may be designated as a pseudo waveguide space S1. The device arrangement surface here may be the device arrangement surface itself, or may be a surface obtained by extending the device arrangement surface in the direction in which the inside member 80 is located when viewed from the edge device 4. Namely, the housing 200 includes the pseudo waveguide space S1.

The opening 801 is formed on the inside member 80, and, in the edge device 4, the antenna 41 has directivity set in a predetermined direction range including the direction in which the opening 801 is located when viewed from the edge device 4, which enables propagation of radio wave through the pseudo waveguide space S1. As a result, by using the pseudo waveguide space S1, it is possible to suppress difficulty of wireless communication in the housing 200 that is downsized and is reduced in height and that includes the inside member 80.

(1k) The housing 200 includes the reinforce member 70 that connects the inner peripheral wall surfaces 302 that face each other. The strength of the housing 200 may be reinforced by the reinforce member 70. In the above embodiment, the management device 2 corresponds to a first communication device, and the edge device 4 corresponds to a second communication device and a specific communication device. The first communication device is a communication device that is included in the communication system 100 and performs wireless communication. The second communication device is a communication device that is included in the communication system 100 and performs wireless communication, and is a communication device different from the first communication device. The antenna 41 corresponds to an antenna included in the specific communication device (i.e., the second communication device). Further, the radio wave in the used frequency band F1 corresponds to radio wave used in the communication system 100.

1-4. Modification Example, FIG. 10

Figure 10:
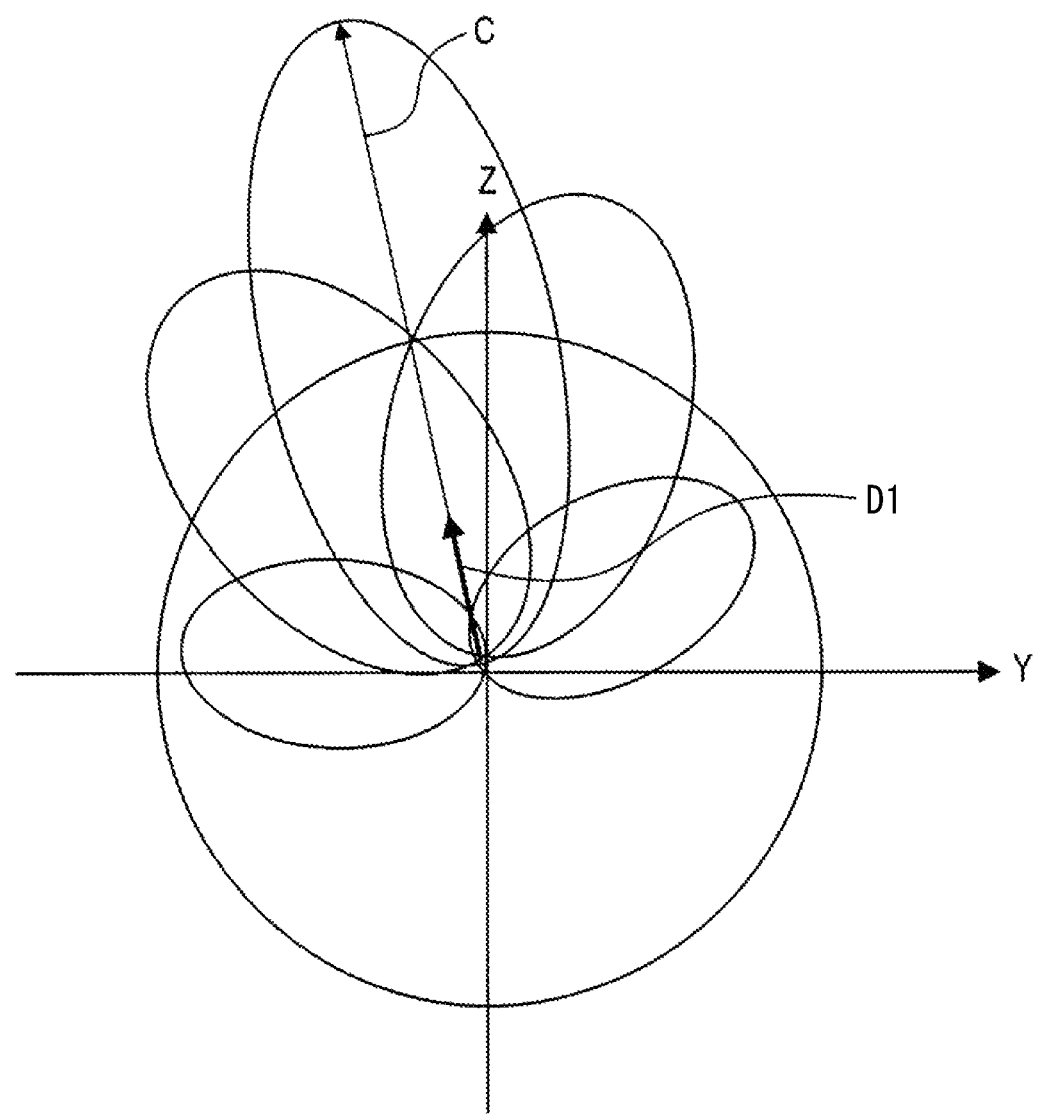
FIG. 10 is an explanatory diagram illustrating directivity of an antenna included in the edge device according to Modification Example 1-1.

(1-1) The antenna 41 may be configured as an antenna for beamforming. For example, as shown in FIG. 10, the antenna 41 may be configured such that the central axis C of its directivity matches the projection direction D1 when the combined vector v3 is projected onto the YZ plane.

Figure 11:
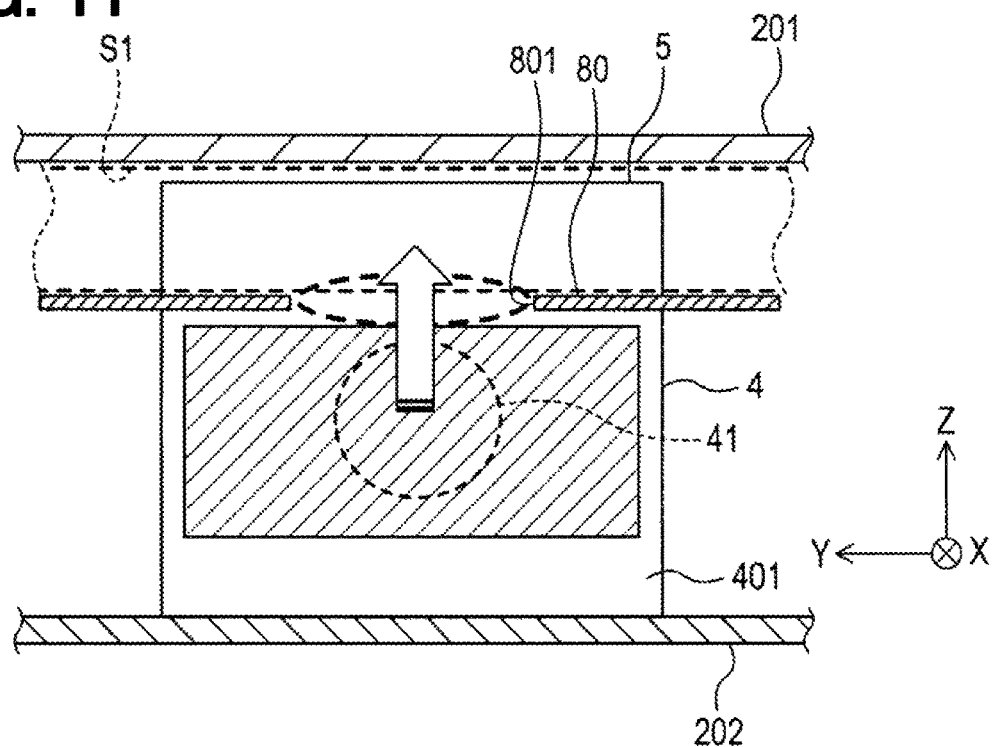
FIG. 11 is an explanatory diagram illustrating directivity of an antenna and propagation of radio wave included in the edge device according to Modification Example 1-2.

(1-2) As shown in FIG. 11, the antenna 41 may be configured to have directivity set in a direction range including the upward direction (i.e., the +Z direction) as the central axis C in which the inside member 80 is located when viewed from the edge device 4. Just like the above embodiment, radio wave is enabled to propagate in the pseudo waveguide space S1.

Figure 12:
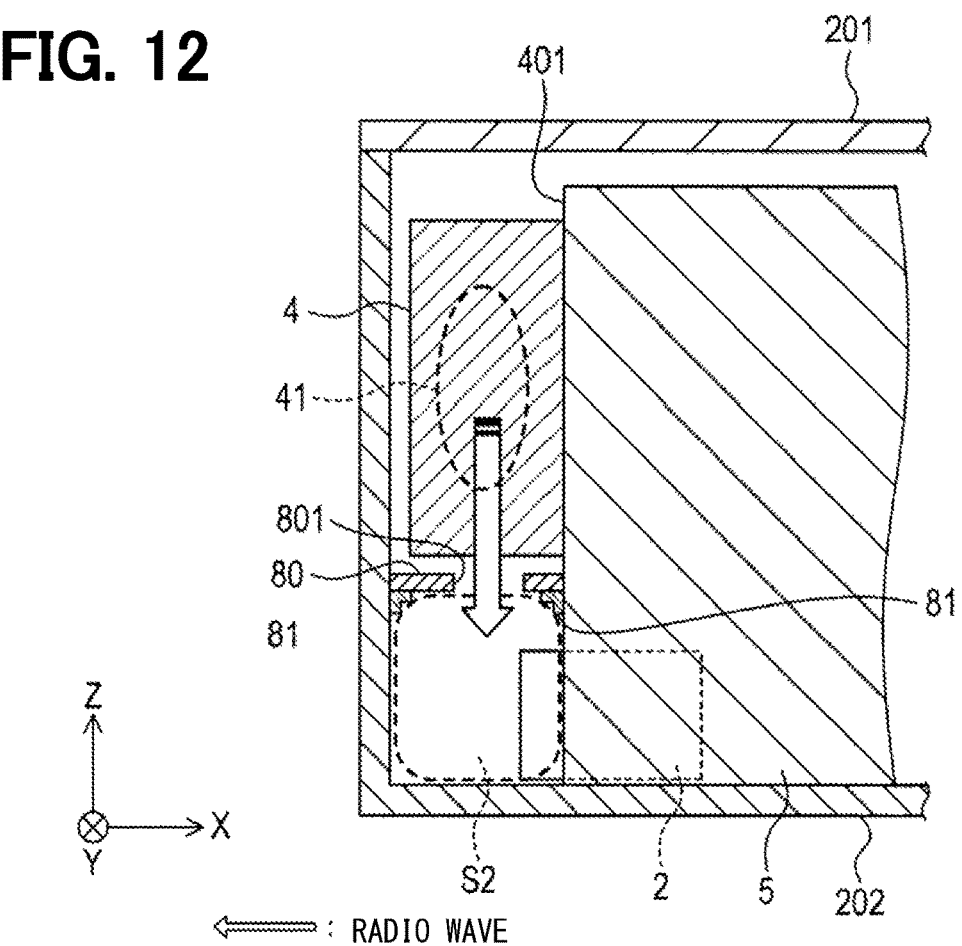
FIG. 12 is an explanatory diagram illustrating directivity of an antenna and propagation of a radio wave included in the edge device according to Modification Example 1-3.
Figure 13:
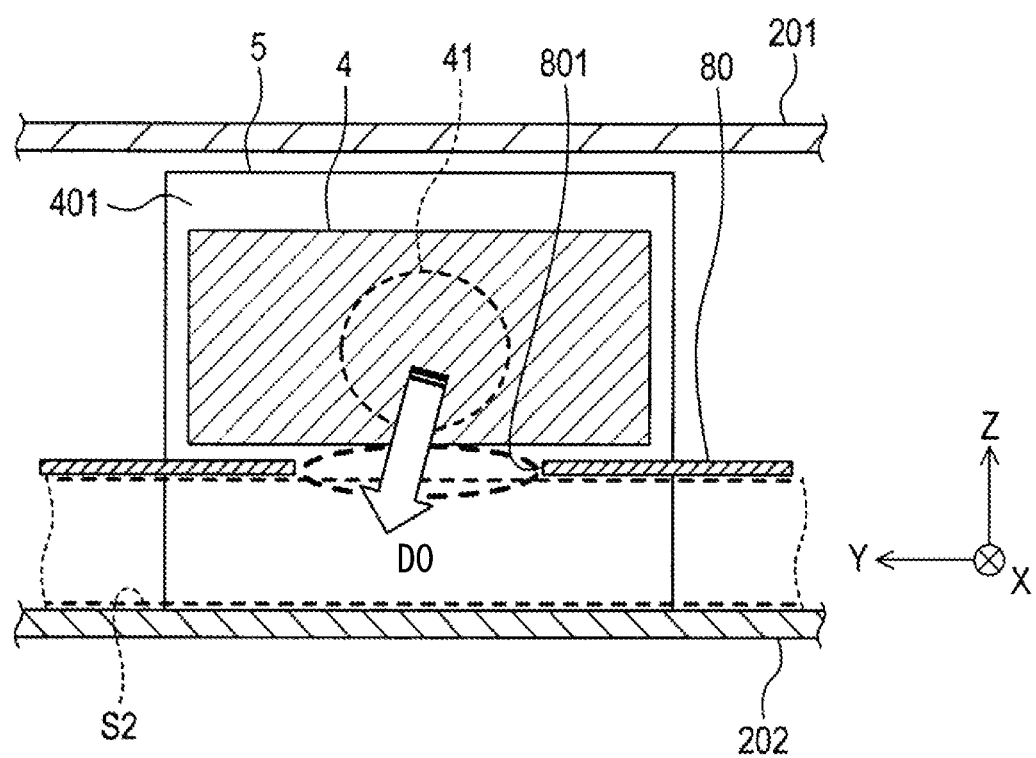
FIG. 13 is an explanatory diagram illustrating directivity of an antenna and propagation of a radio wave included in the edge device according to Modification Example 1-4.

(1-3) Unlike the above-described embodiment, as shown in FIGS. 12 to 13, all of the edge devices 4 may be arranged at relatively upper positions on the device arrangement surface. The inside member 80 may be disposed below each of the edge devices 4 (i.e., below the antenna structure included in the edge device 4). Namely, a pseudo waveguide space S2 may be located below the edge member 4 in the direction in which the inside member 80 is located. Further, the management device 2 may be located at a relatively lower positon in the housing 200. For example, the management device 2 may be arranged on the battery arrangement surface 305 along the inner peripheral wall surface 302_2.

In the present modification example, the deviated-toward management device direction D0 may be a direction that is slightly deviated toward the management device from the downward direction (i.e., from the −Z direction) in which the inside member 80 is located when viewed from the edge device 4. Namely, as shown in FIG. 13, the antenna 41 may be configured to have directivity set in a predetermined direction range including the deviated-toward management device direction D0. The range includes the direction in which the opening 801 is located when viewed from the edge device 4. Further, the range includes the direction in which the management device 2 is located when viewed from the edge device 4.

(1-4) Although not shown, the communication system 100 may include plural the management devices 2 and plural edge devices 4. In such case, in the communication system 100, one of the plurality of management devices 2 and the edge device 4 that communicates with the management device 2 may be configured to transmit and receive radio wave in the pseudo waveguide space S1 located above. May be. Further, in the communication system 100, the other of the plurality of management devices 2 and the edge device 4 that communicates with the management device 2 are configured to transmit and receive radio wave in the pseudo waveguide space S2 located below. Good.

(1-5) In the communication system 100, the reinforce member 70 may be not provided in the housing 200.

(1-6) The battery cells 5 may be arranged side by side along the X direction. Alternatively, the battery cells 5 may be arranged side by side along the X direction and along the Y direction.

In the present embodiment, the management device 2 corresponds to a first communication device, the edge device 4 corresponds to a second communication device and a specific communication device, and the edge device 4 itself corresponds to an antenna structure. The orthogonal surface 401 of the battery cells 5_1-5_3 corresponds to a device arrangement surface, and the inner peripheral wall surface 302_1 corresponds to a specific surface.

2. SECOND EMBODIMENT AND MODIFICATIONS, FIGS. 14-25

2-1. Configuration, FIG. 14

Figure 14:
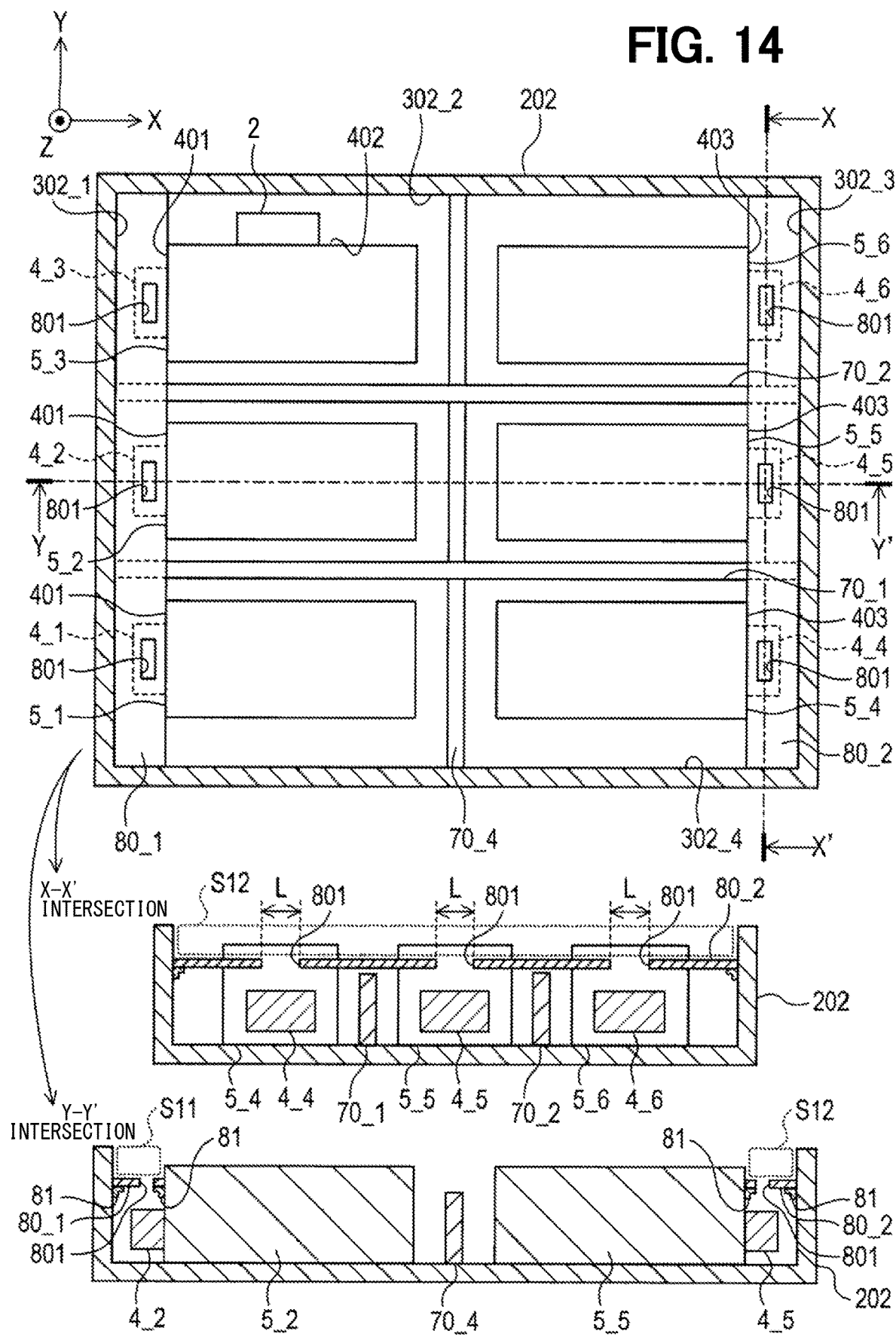
FIG. 14 is an explanatory diagram illustrating an arrangement in a housing 200 of the communication system according to a second embodiment.

Since a basic configuration of the second embodiment is the same as that of the first embodiment, only differences from the first embodiment will be described below regarding FIG. 14. In the following description, the same reference numerals as in the first embodiment indicate the same configurations, and refer to the preceding description.

In the above-described first embodiment, the communication system 100 includes the three battery modules 3. In contrast, the second embodiment differs from the first embodiment in that the communication system 100 includes six battery modules 3 such as the battery module 3_1 to the battery module 3_6. Further, in the above-described first embodiment, the reinforce member 70_1 and the reinforce member 70_2 are arranged side by side in a predetermined direction (i.e., +Y direction) to connect the inner peripheral wall surface 302_1 and the inner peripheral wall surface 302_3.

On the other hand, the second embodiment includes another reinforce member 70 (i.e., a reinforce member 70_4)

that connects (i) the reinforce member 70_1-reinforce member 70_2 and (ii) the inner peripheral wall surface 302_2 and the inner peripheral wall surface 302_4, which is a difference from the first embodiment.

In addition, in the above-described first embodiment, the inside member 80 is provided for each edge device 4, and the opening 801 is formed on the inside member 80. On the other hand, in the second embodiment, one inside member 80 is provided for the plurality of edge devices 4, and the opening 801 corresponding to each of the plurality of edge devices 4 is formed on one inside member 80, which is different from the first embodiment.

<Configuration in the Housing 200>

The plurality of battery cells 5 is arranged along at least one of two directions in series. Namely, arrangement of the battery cells 5 extends along at least one of a first direction and a second direction, respectively extending perpendicular to each other along the battery arrangement surface 305. For example, in the present embodiment, as shown in FIG. 14, the first direction corresponds to the X direction, the second direction corresponds to the Y direction, and the plurality of battery cells 5_1-5_6 are arranged on the battery arrangement surface 305, along both of the X and Y directions.

The housing 200 includes at least one reinforce member 70 that connects the inner peripheral wall surfaces 302 that face each other. There may be plural reinforce members 70. In the housing 200, the plurality of reinforce members 70 may be arranged to intersect with each other. The term "intersection" as used herein includes orthogonality. The reinforce member 70 may have one end connected to the inner peripheral wall surface 302 and the other end connected to another reinforce member 70.

For example, in the present embodiment, the reinforce members 70_1-70_2 connect the inner peripheral wall surface 302_1 and the inner peripheral wall surface 302_3, and the reinforce member 70_4 connects the inner peripheral wall surface 302_2 and the inner peripheral wall surface 302_4. The reinforce members 70_1-70_2 and the reinforce member 70_4 are arranged to be orthogonal to each other.

In the housing 200, a section partitioned by the reinforce member 70 may be formed, and at least one battery cell 5 may be arranged in one section. For example, in the present embodiment, six sections are formed by the reinforce member 70, and each of the formed sections has one of the plurality of battery cells 5_1-5_6 (i.e., one cell in one section).

The management device 2 is arranged in at least one of the sections formed by the reinforce member 70. For example, in the present embodiment, the management device 2 is arranged in the section including the battery cell 5_3. The management device 2 is arranged at a relatively upper position on one of the orthogonal surfaces of the battery cells 5 which serves as a device arrangement surface.

For example, in the present embodiment, the management device 2 is arranged in a section including the battery cells 5_3, and is arranged at a relatively upper position on the device arrangement surface, i.e., on an orthogonal surface 402 serving as the device arrangement surface. The orthogonal surface 402 is one of the orthogonal surfaces included in the battery cell 5_3 and is an orthogonal surface that faces the inner peripheral wall surface 302_2.

The management device 2 may include the module housing 51, the antenna cover 52, the substrate 53, and the like, similarly to the edge device 4 shown in FIG. 2 described above. The substrate 53 includes a management module 28 instead of the edge module 48. The management module 28 includes the wireless communicator 22 and the management controller 23.

Each of the plurality of edge devices 4 serving as the specific communication device is arranged either at a relatively upper position or a relative lower position on the device arrangement surface, which is, respectively, a device arrangement surface provided as an orthogonal surface in the battery cell 5 facing the same specific surface. For example, in the present embodiment, each of the edge devices 4_1-4_3 has, as a device arrangement surface, the orthogonal surface 401, which is an orthogonal surface provided in each of the battery cells 5_1-5_3 and faces the inner peripheral wall surface 302 serving as the same specific surface. The inner peripheral wall surface 302 here is the inner peripheral wall surface 302_1. The battery cells 5 in which the respective edge devices 4_1-4_3 are arranged are located in the same section as the respective edge devices 4. Then, each of the edge devices 4_1-4_3 is arranged at a relatively upper position on the device arrangement surface (i.e., on the orthogonal surface 401).

Similarly, each of the edge devices 4_4-4_6 is arranged on the device arrangement surface that is the orthogonal surface 403 facing the same specific surface described above, i.e., facing the inner peripheral wall surface 302_3. Although not shown, similarly to the above-described embodiment, the edge device 4 includes an antenna structure including the antenna 41 at a position between the device arrangement surface and the same specific surface as described above.

One inside member 80 is arranged for plural edge devices 4 arranged on the orthogonal surface facing the same specific plane as the device placement plane. The inside member 80 connects the same specific surface and the device arrangement surface. For example, in the present embodiment, an inside member 80_1 is arranged above the edge devices 4_1-4_3, and connects the inner peripheral wall surface 302_1 and the respective orthogonal surfaces 401 of the battery cells 5_1-5_3. An inside member 80_2 is disposed above the edge device 4_4-4_6, and connects the inner peripheral wall surface 302_2 and the respective orthogonal surfaces 402 of the battery cells 5_4-5_6.

The inside member 80 is formed in a plate shape as in the first embodiment. Further, the inside member 80 is formed to extend in the direction along which the edge devices 4 are arranged in series. The direction along which the edge devices 4 are arranged in series is a direction along which the device arrangement surfaces extends, and corresponds to the Y direction in the present embodiment. Namely, as shown in FIG. 14, in the housing 200, a pseudo waveguide space S11 is located in a direction in which the inside member 80_1 is located when viewed from the respective edge devices 4_1-4_3. Similarly, with respect to the edge device 4_4-4_6, a pseudo waveguide space S12 is located in a direction in which the inside member 80_2 is located when viewed from the edge device 4_4-4_6.

The inside member 80 is formed with plural openings 801 corresponding to the plurality of edge devices 4, respectively. Each opening 801 formed on the inside member 80 is formed on the inside member 80 in the same manner as in the first embodiment.

For example, in the present embodiment, the inside member 80_1 is formed with a total of three openings 801 corresponding to the respective edge devices 4_1 to 4_3. The inside member 80_2 is formed with a total of three openings 801 corresponding to the respective edge devices 4_4 to 4_6. Similar to the first embodiment, each opening 801 is formed such that each opening projection area 811

(not shown) overlaps the antenna projection area 812 (not shown) of each edge device 4.

In each edge device 4, the antenna 41 (not shown) has directivity set in a predetermined direction range including at least the direction in which the opening 801 is located, as in the first embodiment. Namely, in the communication system 100 of the present embodiment, wireless communication using the pseudo waveguide spaces S11 and S12 is performed via the opening 801 as in the first embodiment.

2-2. Effects

According to the second embodiment described in detail above, the same effects as the effects (1a)-(1k) of the above-described first embodiment may are achievable, and further the following effects are also achievable.

(2a) Since one inside member 80 is arranged for the plurality of edge devices 4, the number of members to be used is reducible and the structure is simplified. In the present embodiment, the management device 2 corresponds to the first communication device, the edge device 4 corresponds to the second communication device and the specific communication device, and the edge device 4 itself corresponds to an antenna structure. Regarding the edge devices 4_1-4_3, the orthogonal surface 401 of the battery cells 5_1-5_3 corresponds to a device arrangement surface, and the inner peripheral wall surface 302_1 corresponds to the same specific surface. Regarding the edge devices 4_4-4_6, the orthogonal surface 402 of the battery cells 5_4-5_6 corresponds to a device arrangement surface, and the inner peripheral wall surface 302_3 corresponds to the same specific surface.

2-3. Modification Example, FIG. 15

Figure 15:
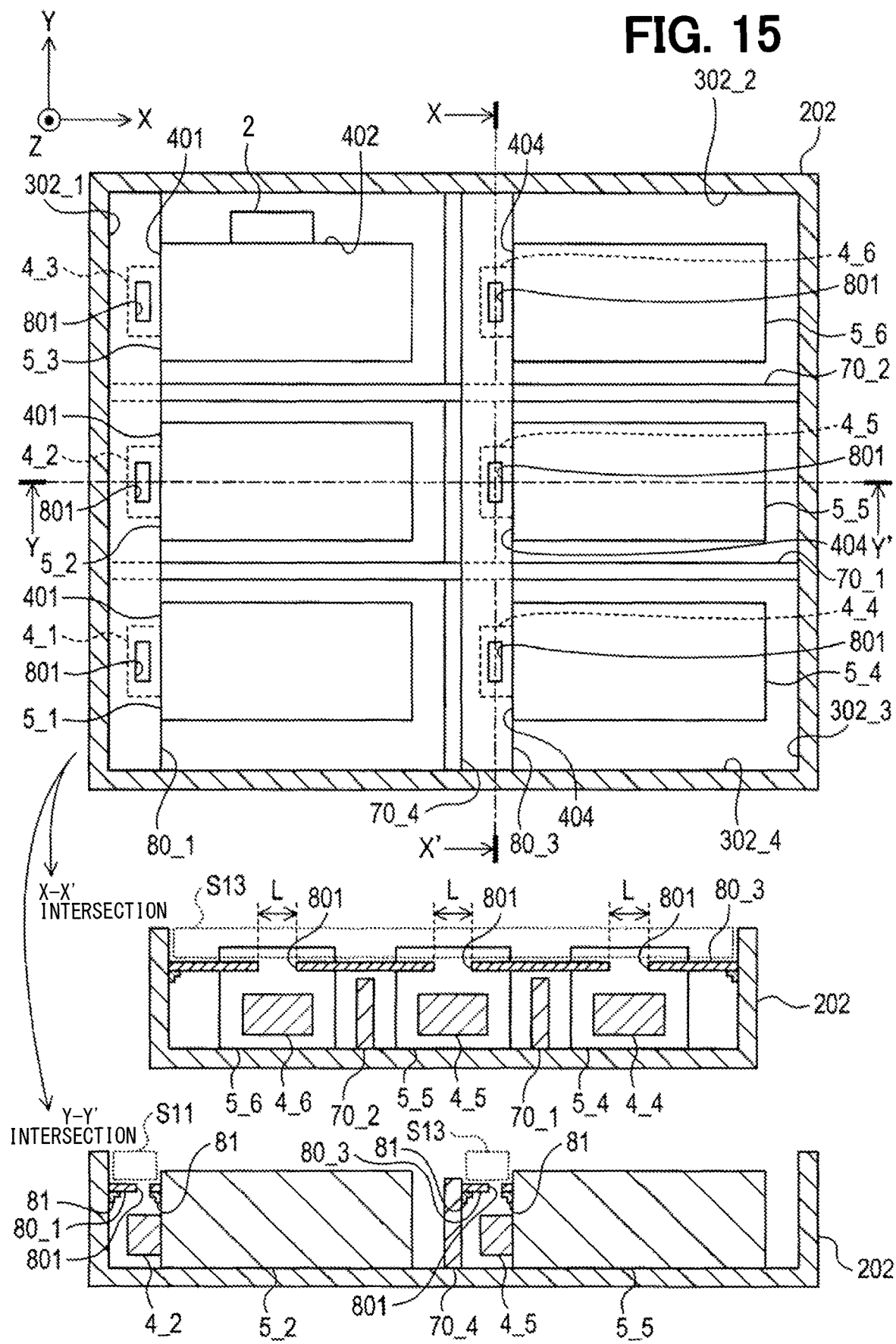
FIG. 15 is an explanatory diagram illustrating Modification Example 2-1.

(2-1) In FIG. 15, each of the edge devices 4_4-4_6 may be arranged on an orthogonal surface 404 serving as the device arrangement surface. The orthogonal surface 404 is an orthogonal surface included in each of the battery cells 5_4-5_6 and is an orthogonal surface facing a +X side surface among the orthogonal surfaces of the reinforce member 70_4. The +X side surface among the orthogonal surfaces of the reinforce member 70_4 corresponds to the same specific surface described above for the edge device 4_4-4_6.

As described above, at least one specific surface that is an orthogonal surface facing the device arrangement surface (i.e., the orthogonal surface 404 of the present modification) may be an orthogonal surface of the reinforce member 70. The inside member 80_2 may be arranged above the antenna structure included in the edge devices 4_4-4_6. A pseudo waveguide space S13 is located in the direction in which the inside member 80_2 is located when viewed from the edge device 4_4-4_6.

As a result, radio wave may propagate using the pseudo waveguide spaces S11 and S13 as in the above-described embodiment. Namely, the strength of the housing 200 may be reinforced by the reinforce member 70, and it is possible to suppress difficulty of wireless communication in the housing 200 having a reduced size/volume and a reduced height.

Figure 16:
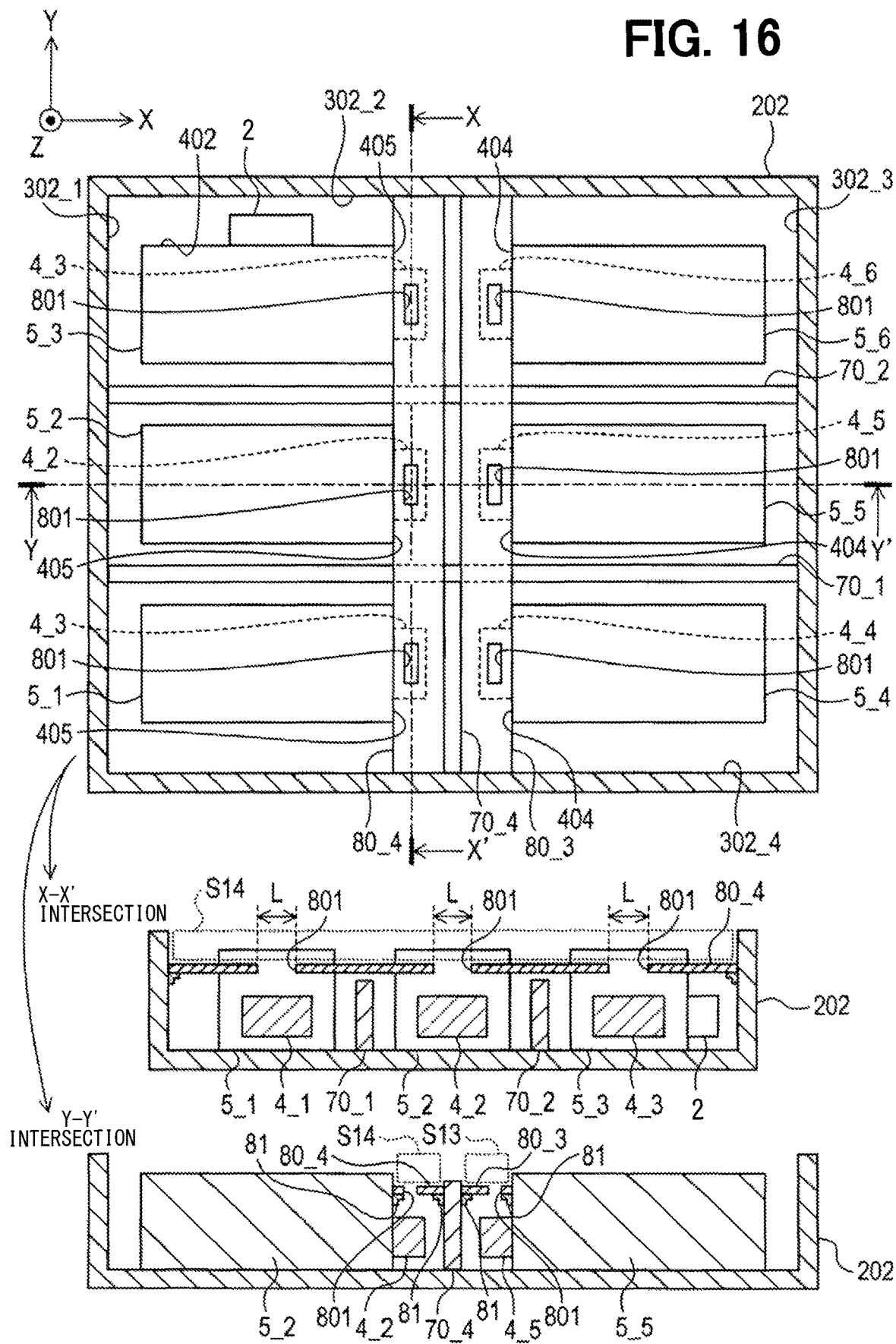
FIG. 16 is an explanatory diagram illustrating Modification Example 2-2.

(2-2) In FIG. 16, each of the edge devices 4_1-4_3 may be arranged on the device arrangement surface, i.e., on an orthogonal surface 405 serving as the device arrangement surface. The orthogonal surface 405 is an orthogonal surface included in each of the battery cells 5_1-5_3, and is an orthogonal surface facing the −X side surface of the orthogonal surfaces included in the reinforce member 70_4. The −X side surface of the orthogonal surfaces of the reinforce member 70_4 corresponds to the same specific surface described above. The inside member 80_4 may be disposed above the antenna structure of the edge devices 4_1-4_3.

A pseudo waveguide space S14 is located in a direction in which the inside member 80_4 is located when viewed from the edge devices 4_1-4_3. As a result, radio wave may propagate using the pseudo waveguide spaces S13 and S14 in the same manner as in the above-described embodiment. Then, it is possible to achieve the same effect as that of the Modification Example (2-1).

Figure 17:
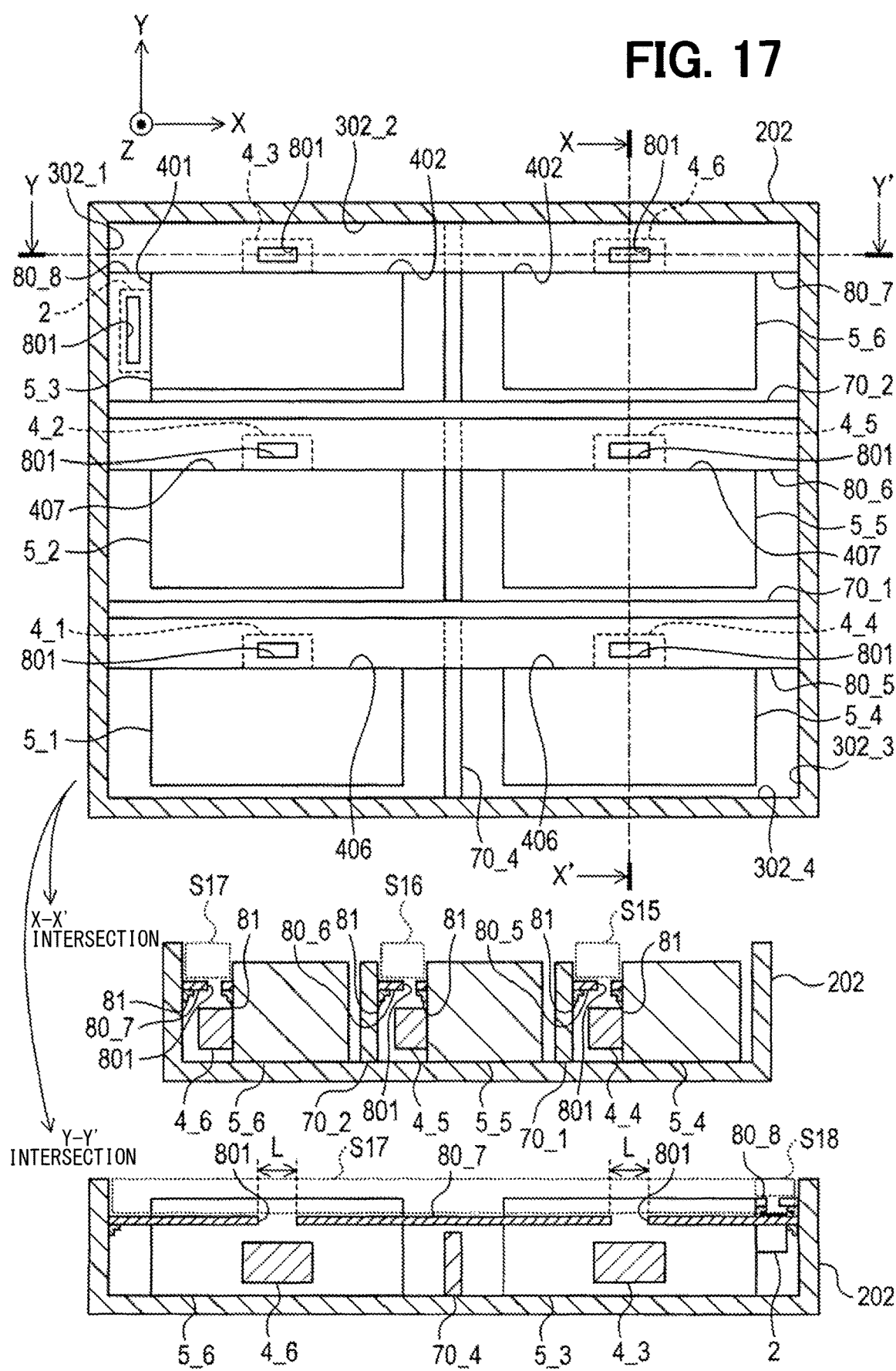
FIG. 17 is an explanatory diagram illustrating Modification Example 2-3.

(2-3) In contrast to the second embodiment, the edge devices 4_1 and 4_4 serving as specific devices may be arranged on the device arrangement surface, i.e., on an orthogonal surface 406 serving as the device arrangement surface as shown in FIG. 17. The orthogonal surface 406 is an orthogonal surface included in each of the battery cells 5_1 and 5_4, and is an orthogonal surface facing the −Y side surface among the orthogonal surfaces included in the reinforce member 70_1. The −Y side surface of the orthogonal surfaces of the reinforce member 70_1 corresponds to the same specific surface described above.

The edge devices 4_2 and 4_5 as specific devices may be arranged on the device arrangement surface, i.e., on an orthogonal surface 407 serving as the device arrangement surface. The orthogonal surface 407 is an orthogonal surface included in each of the battery cells 5_2 and 5_5, and is an orthogonal surface facing the −Y side surface among the orthogonal surfaces included in the reinforce member 70_2. The −Y side surface of the orthogonal surfaces of the reinforce member 70_2 corresponds to the same specific surface described above.

The edge devices 4_3 and 4_6 as the specific devices may be arranged on the device arrangement surface, i.e., on the orthogonal surface 402 as the device arrangement surface. The orthogonal surface 402 is an orthogonal surface included in each of the battery cells 5_3 and 5_6, and is an orthogonal surface that faces the inner peripheral wall surface 302_2. The inner peripheral wall surface 302_2 corresponds to the same specific surface described above.

An inside member 80_5 may be arranged above the antenna structure included in the edge devices 4_1, 4_4. A pseudo waveguide space S15 is located in a direction in which the inside member 80_5 is located when viewed from the edge devices 4_1 and 4_4. An inside member 80_6 may be arranged above the antenna structure included in the edge devices 4_2, 4_5. A pseudo waveguide space S16 is located in a direction in which the inside member 80_6 is located when viewed from the edge devices 4_2 and 4_5.

An inside member 80_7 may be arranged above the antenna structure included in the edge devices 4_3 and 4_6. A pseudo waveguide space S17 is located in a direction in which the inside member 80_7 is located when viewed from the edge devices 4_3 and 4_6.

The communication system 100 may include at least one management device 2 as a specific communication device. For example, in the present modification example, the communication system 100 includes one management device 2 as a specific communication device. If the communication system 100 includes plural management devices 2, the communication system 100 may include plural management devices 2 respectively as a specific communication device.

The management device 2 as the specific device may be arranged on the device arrangement surface, i.e., on the orthogonal surface 401 serving as the device arrangement surface. The orthogonal surface 401 is an orthogonal surface included in the battery cell 5_3 and is an orthogonal surface facing the inner peripheral wall surface 302_1. The inner peripheral wall surface 302_1 corresponds to a specific surface.

In the present modification example, the management device 2 includes the module housing 51, the antenna cover 52, the substrate 53 including the antenna 21 and the management module 28, similarly to the edge device 4 shown in FIG. 4 described above. The management device 2 includes an antenna structure including the antenna 21 at a position between the device arrangement surface and the above-described specific surface. In the present modification example, the antenna structure of the management device 2 is the management device 2 itself including the module housing 51, the antenna cover 52, the substrate 53 including the antenna 21 and the management module 28.

An inside member 80_8 may be arranged at least one of above or below the antenna structure included in the management device 2, similar to a case where the edge device 4 is a specific communication device. In the present modification example, the inside member 80_8 is arranged in a direction in which the inside member 80_8 is located (i.e., above) when viewed from the antenna structure (i.e., the management device 2 itself) included in the management device 2.

A pseudo waveguide space S18 is located in the direction in which the inside member 80_8 is located when viewed from the management device 2. The opening 801 is formed on the inside member 80_8 as a case where the edge device 4 is a specific communication device. Further, in the management device 2 serving as a specific communication device, the antenna 21 has directivity set in a predetermined direction range including at least the direction in which the opening 801 of the inside member 80_8 is located when viewed from the management device 2.

In particular, in the present modification example, the antenna 21 has directivity set in a predetermined direction range including (i) a direction in which the opening 801 of the inside member 80_8 is located when viewed from the management device 2 and (ii) a direction in which the edge device 4 is located when viewed from the management device 2. Thereby, in addition to the pseudo waveguide spaces S15-S17 close to the edge device 4, radio wave propagates using the pseudo waveguide space S18 close to the management device 2. As a result, wireless communication in the housing 200 is performable with a higher communication success probability.

Figure 18:
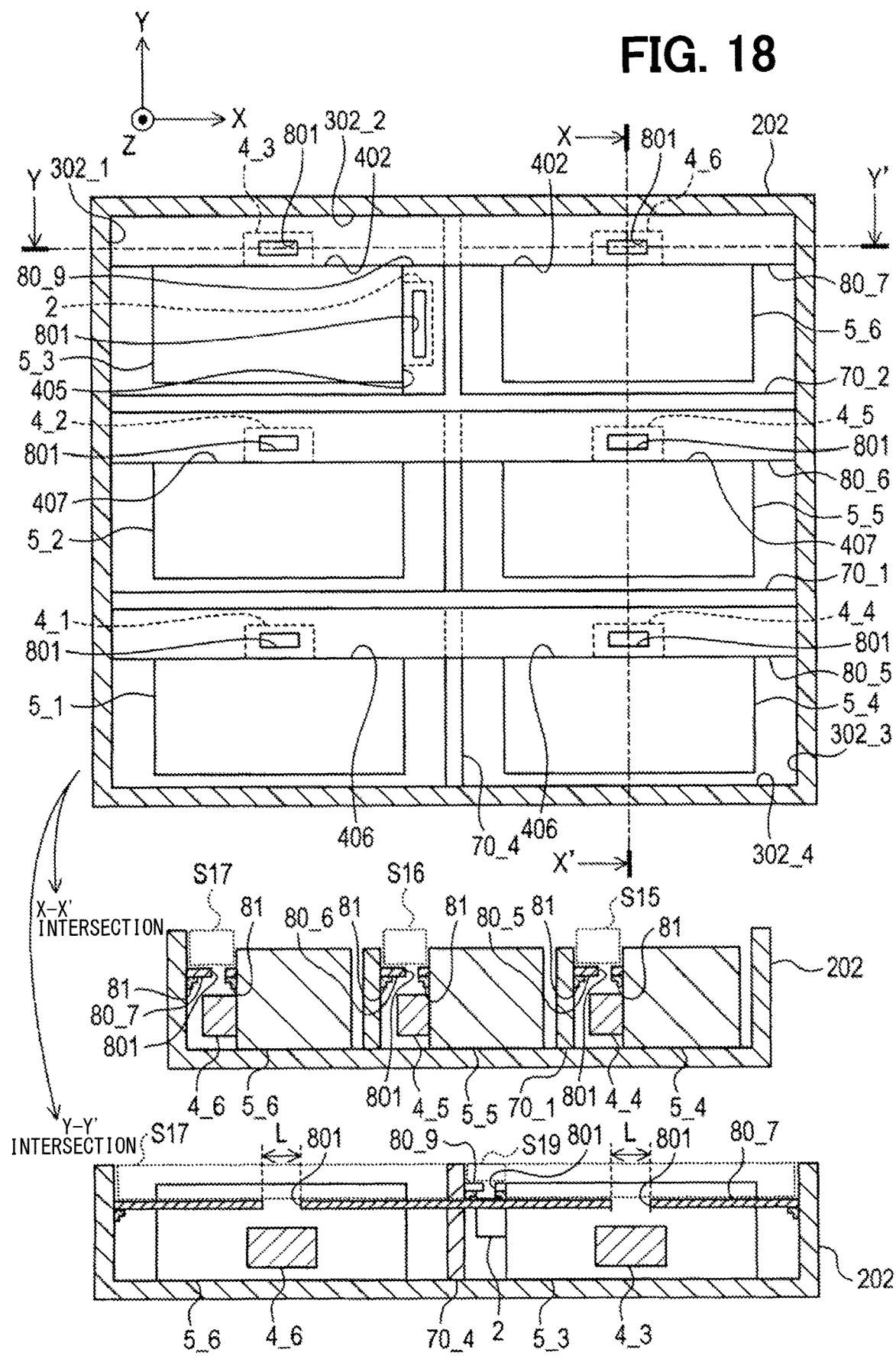
FIG. 18 is an explanatory diagram illustrating Modification Example 2-4.

(2-4) As shown in FIG. 18, the management device 2 as a specific communication device in Modification Example 2-3 may be arranged on the device arrangement surface, i.e., on the orthogonal surface 405 as a device arrangement surface. The orthogonal surface 405 is an orthogonal surface included in the battery cell 5_3, and is an orthogonal surface facing the -X side surface of the orthogonal surfaces included in the reinforce member 70_4 serving as the specific surface. Among the orthogonal surfaces of the reinforce member 70_4, the surface on the -X side corresponds to a specific surface. An inside member 80_9 is disposed above the antenna structure included in the management device 2. A pseudo waveguide space S19 is located in a direction in which the inside member 80_9 is located when viewed from the management device 2.

The opening 801 is formed on the inside member 80_9, as in the Modification Example 2-3. Then, in the management device 2, the antenna 21 has directivity set in a predetermined direction range including at least a direction in which the opening 801 of the inside member 80_9 is located when viewed from the management device 2, as in the Modification Example 2-3.

Thereby, in addition to the pseudo waveguide spaces S15-S17 close to the edge device 4, radio wave propagates using the pseudo waveguide space S19 close to the management device 2. As a result, like the Modification Example 2-3, wireless communication in the housing 200 is performable with a higher communication success probability.

Figure 19:
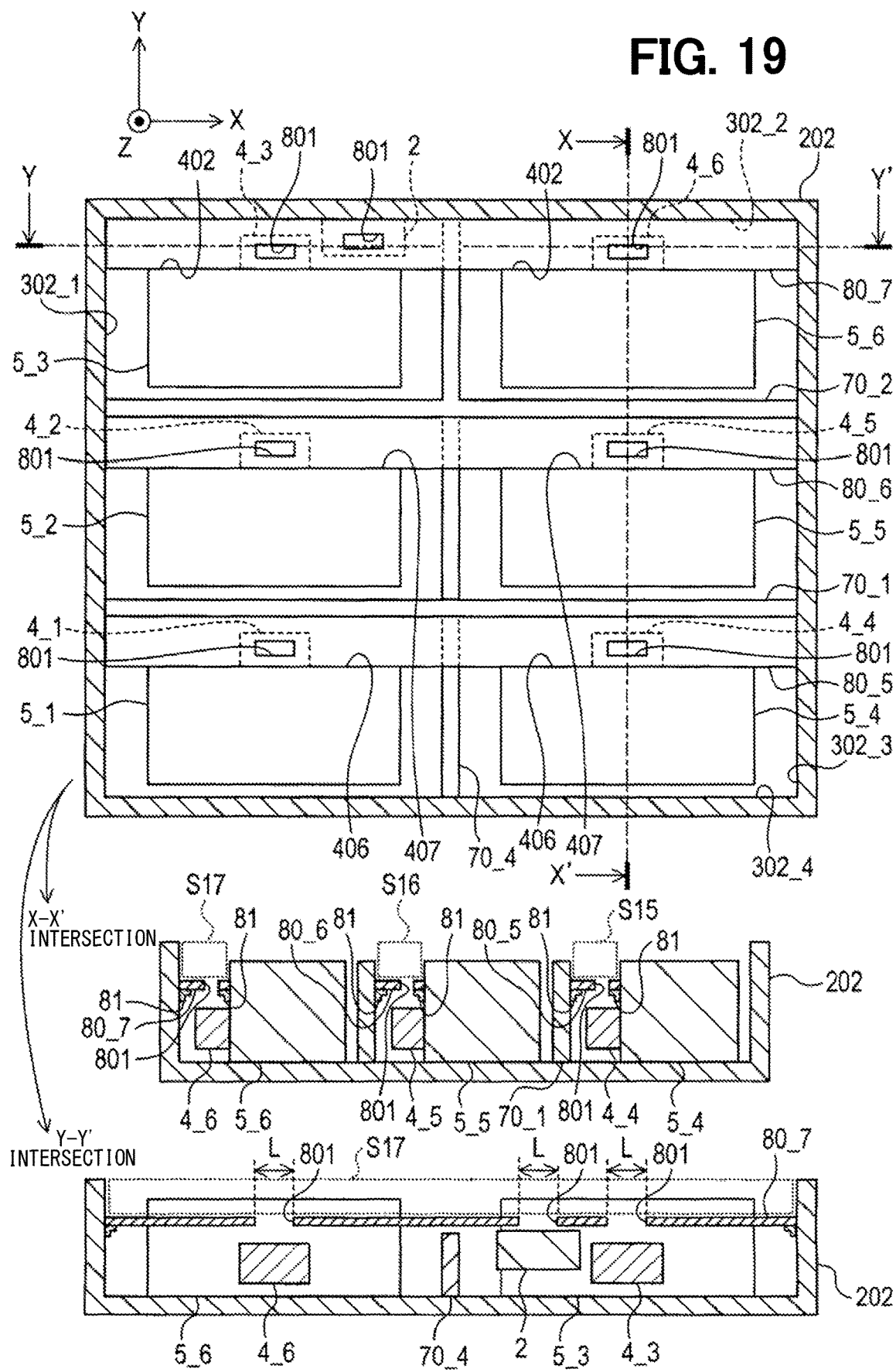
FIG. 19 is an explanatory diagram illustrating Modification Example 2-5.

(2-5) As shown in FIG. 19, the management device 2 as the specific communication device in the Modification Example 2-3 may also be arranged at a relatively upper position on the device arrangement surface, i.e., on the inner peripheral wall surface 302_2 serving as a device arrangement surface. In the present modification example, with respect to the management device 2, the orthogonal surface 402 of the battery cell 5_3 facing the inner peripheral wall surface 302_2 corresponds to a specific surface.

The inside member 80_7 in the present modification example is arranged above the antenna structures included in the edge devices 4-3 and 4-6 and above the antenna structure included in the management device 2. On the inside member 80_7 in the present modification example, two openings 801 for the edge devices 4-3, 4-6 and one opening 801 for the management device 2 are formed, as in the above-described embodiment.

In the management device 2, the antenna 21 has directivity set in a predetermined direction range including at least a direction in which the opening 801 closest to the management device 2 is located, as in the Modification Example 2-3. As a result, in the present modification example, wireless communication is performable using the pseudo waveguide spaces S15-S17. Further, in the present modification example, the inside member 80 for the management device 2 and the inside member 80 for the edge device 4 are used in common (i.e., shared among them), thereby the number of members to be used in the communication system 100 is reduced and the configuration is simplified.

Figure 20:
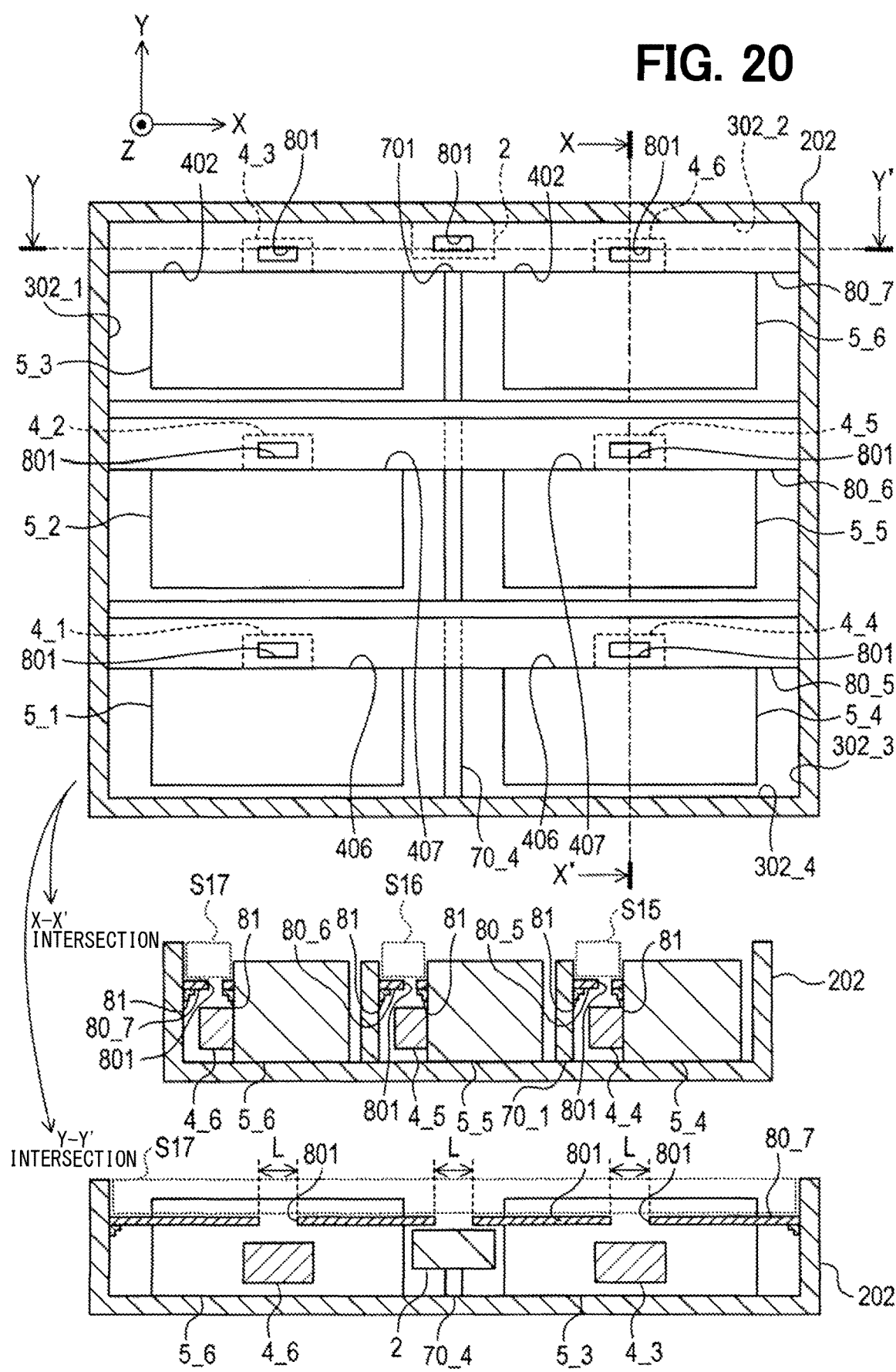
FIG. 20 is an explanatory diagram illustrating Modification Example 2-6.

(2-6) Note that, as shown in FIG. 20, the management device 2 as a specific communication device in the Modification Example 2-5 may be arranged at a relatively upper position on the device arrangement surface, i.e., on the inner peripheral wall surface 302_2 serving as a device arrangement surface. In the present modification example, with respect to the management device 2, a +Y side surface 701 among the orthogonal surfaces of the reinforce member 70 facing the inner peripheral wall surface 302_2 corresponds to a specific surface.

As a result, in the present modification example, the same effects as those of the Modification Example 2-5 are achievable. Further, in the present modification example, the inside member 80_7 further connects the inner peripheral wall surface 302_2 as a device arrangement surface and the surface 701 as a specific surface, thereby the housing 200 is reinforced more firmly.

THIRD EMBODIMENT

1-1. Configuration

In the above-described embodiment, the inside members 80_1-80_9 that connect the device arrangement surface and the specific surface are configured to treat, as the specific surface, (i) the inner peripheral wall surface 302 facing the device arrangement surface and (ii) the orthogonal surface of the reinforce member 70 facing the device arrangement surface. Each of these is an orthogonal surface close to the device arrangement surface.

On the other hand, in the third embodiment, the difference from the second embodiment is that the inside member 80 is configured in such a manner that an orthogonal surface facing the device arrangement surface with the reinforce member 70 interposed in between is defined as the specific surface (i.e., the same specific surface described above).

Figure 21:
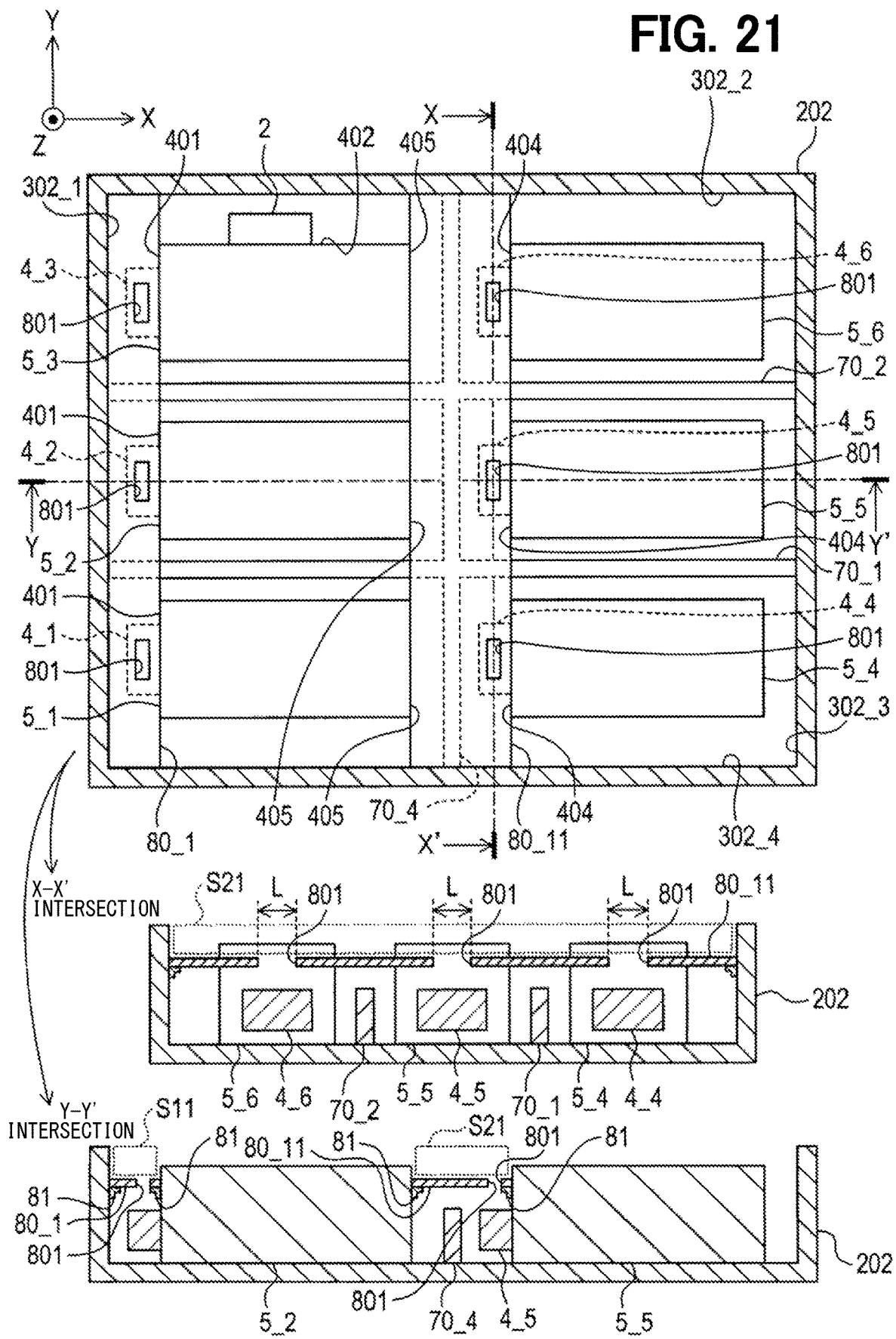
FIG. 21 is an explanatory diagram illustrating an arrangement in the housing 200 of the communication system according to a third embodiment.

For example, in the present embodiment, an inside member 80_11 is used instead of the inside member 80_3 in the Modification Example 2-1. As shown in FIG. 21, the inside member 80_11 connects (A) the orthogonal surface 404 of the battery cells 5_4-5_6 serving as a device arrangement surface and (B) the orthogonal surface 405 of the other battery cells 5_1-5_3 facing the device arrangement surface of those cells 5_4-5_6 with the reinforce member 70_4 interposed therebetween. The orthogonal surfaces 405 of the other battery cells 5_1-5_3 respectively facing the battery cells 5 having the device arrangement surface across the reinforce member 70_4 corresponds to a specific surface.

A wider pseudo waveguide space S21 is located in a direction in which the inside member 80_11 is located when viewed from the edge device 4. The opening 801 is formed on the inside member 80_11 similarly to the inside member 80_3. The antenna 41 included in the edge device 4 is configured similarly to the antenna 41 of the edge device 4 included in the Modification Example 2-1. Namely, in the present modification example, radio wave propagates in both of the pseudo waveguide space S11 and the wider pseudo waveguide space S21.

3-2. Effects

According to the third embodiment described in detail above, the same effects as those of the above-described first and second embodiments are achievable, together with the following effects.

(3a) Since radio wave propagates in the pseudo waveguide space S11 and the wider pseudo waveguide space S21, thereby wireless communication is performable in the housing 200 with a higher communication success probability.

(3b) The inside member 80 is configured to connect the device arrangement surface and the specific surface, when the orthogonal surface facing the device arrangement surface with the reinforce member 70 interposed therebetween serve as a specific surface. As a result, the device arrangement surface may be fixed to a specific surface regardless of the configuration of the reinforce member 70. Namely, in other words, the battery cell 5 having the device arrangement surface is fixable to a specific surface of a component other than the reinforce member 70, and the movement/vibration of the battery cell 5 is suppressible. Since the reinforce member 70 may be made of any material, may take any shape, may be arbitrarily arranged, or the like, the degree of freedom is improvable as to how to reinforce the structure when reinforcing the housing 200.

Figure 22:
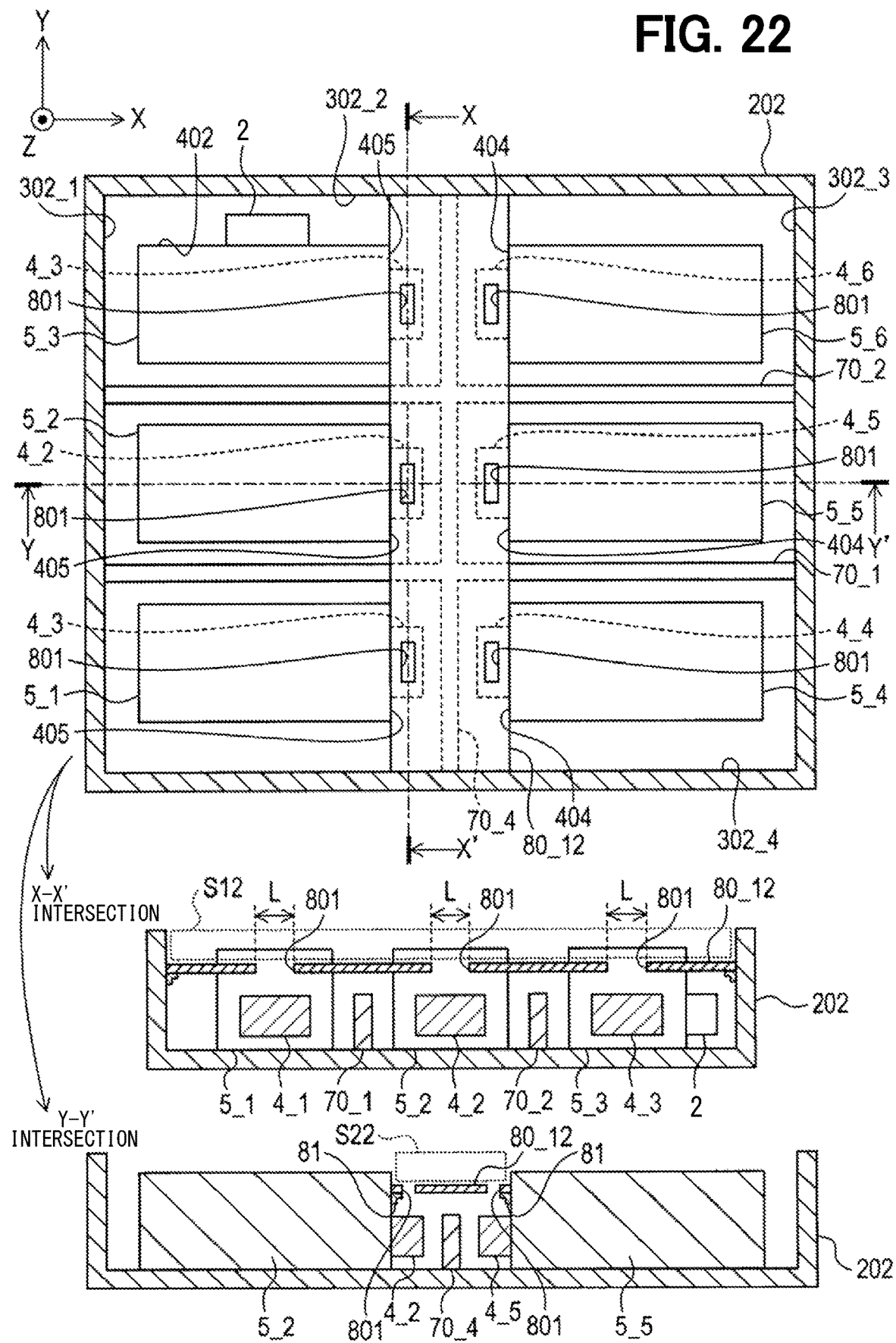
FIG. 22 is an explanatory diagram illustrating Modification Example 3-1.

3-3. Modification Example (3-1) In the Modification Example 2-2, an inside member 80_12 may be used instead of the inside members 80_3 and 80_4. As shown in FIG. 22, the inside member 80_12 connects (A) the orthogonal surface 404 of each of the battery cells 5_4-5_6 serving as a device arrangement surface, and (B) the orthogonal surface 405 of each of the other battery cells 5_1-5_3 facing the battery cell 5 having the device arrangement surface with the reinforce member 70_4 interposed therebetween. The orthogonal surface 405 of the other battery cells 5_1-5_3, which face the battery cells 5_4-5_6 having the device arrangement surface with the reinforce member 70_4 interposed therebetween, corresponds to a specific surface.

The inside member 80_12 may also be describable as connecting (A) the orthogonal surfaces 405 of the battery cells 5_1-5_3 serving as a device arrangement surface and (B) the orthogonal surface 404 of the other battery cells 5 that face battery cells 5 respectively having the device arrangement surface with the reinforce member 70_4 interposed therebetween. It may also be describable that the orthogonal surface 401 of the other battery cells 5_4-5_6 facing the battery cells 5_1-5_3 having the device arrangement surface with the reinforce member 70_4 interposed therebetween corresponds to a specific surface.

A wider pseudo waveguide space S22 is located in a direction in which the inside member 80_12 is located when viewed from the edge device 4. The opening 801 is formed on the inside member 80_12 for each of the edge devices 4 similarly to the inside members 80_3 and 80_4. Namely, six openings 801 are formed on the inside member 80_12.

The antenna 41 included in each edge device 4 is configured to have the same directivity as the antenna 41 of each edge device 4 in the Modification Example 2-2. As a result, in the present modification example, radio wave propagates in the wider pseudo waveguide space S22. In addition, in the present modification example, the inside member 80_3 and the inside member 80_4 may be integrated, so that the number of members may be reduced thereby achieving a simpler configuration.

Figure 23:
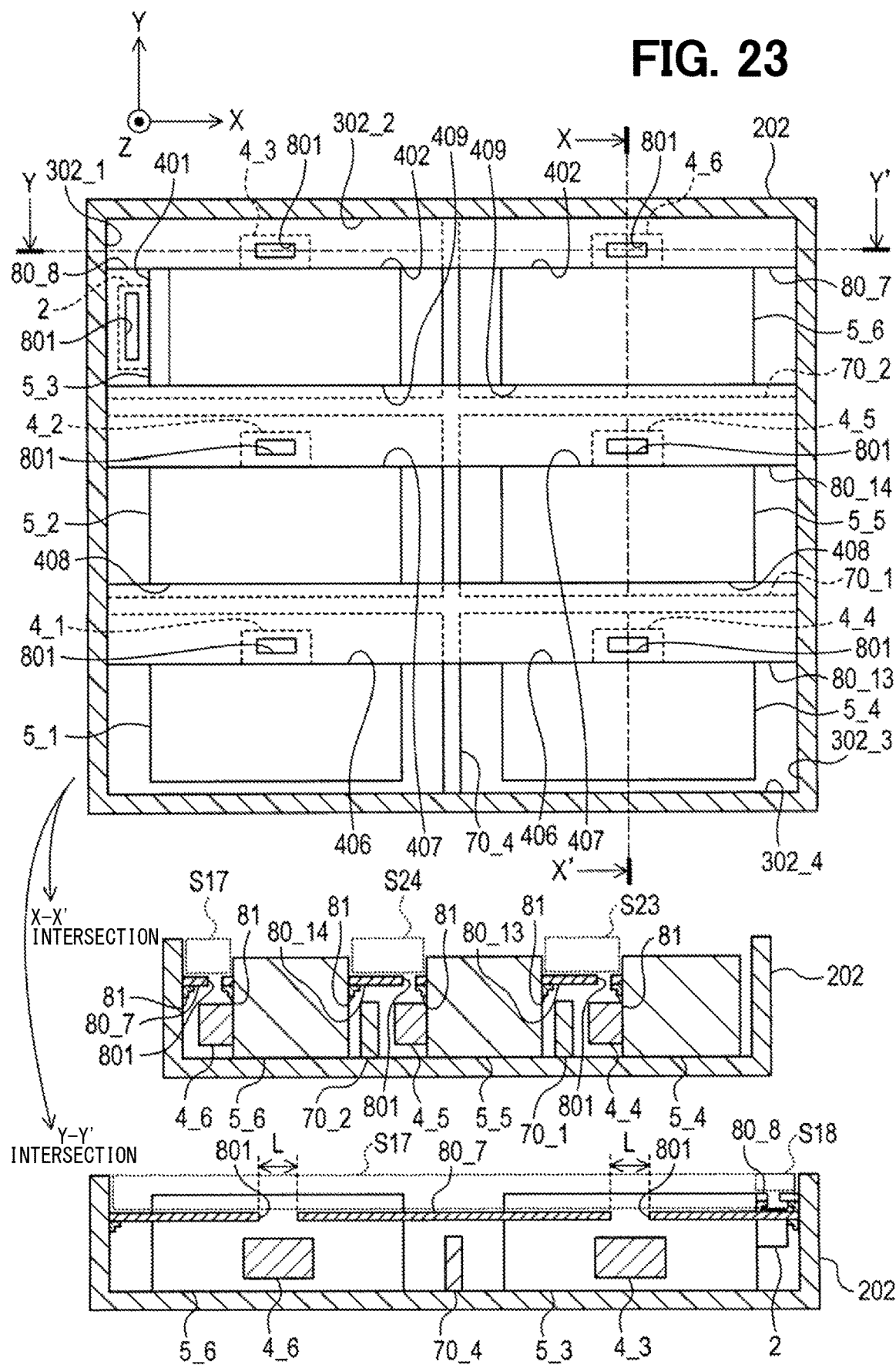
FIG. 23 is an explanatory diagram illustrating Modification Example 3-2.

(3-2) The inside member 80_5 used in the Modification Example 2-3 may be replaced with an inside member 80_13, as shown in FIG. 23. The inside member 80_13 connects (A) the orthogonal surface 406 of each of the battery cells 5_1 and 5_4 serving as a device arrangement surface and (B) an orthogonal surface 408 of the other battery cells 5_2 and 5-5 that face the battery cell 5 having the device arrangement surface with the reinforce member 70_1 interposed therebetween. The orthogonal surface 408 of each of the other battery cells 5_2 and 5_5, which faces the battery cells 5_1 and 5_4 having the device arrangement surface with the reinforce member 70_1 interposed therebetween, corresponds to a specific surface. A wider pseudo waveguide space S23 is located in a direction in which the inside member 80_13 is located when viewed from the edge devices 4_1 and 4_4.

An inside member 80_14 may also be used instead of the inside member 80_6. The inside member 80_14 connects (A) the orthogonal surface 407 of each of the battery cells 5_2, 5_5 serving as a device arrangement surface and (B) an orthogonal surface 409 of each of the other battery cells 5-3, 5-6 facing the battery cell 5 having the device arrangement surface across the reinforce member 70_2. The orthogonal surface 409 of each of the other battery cells 5_3 and 5_6 facing the battery cells 5_2 and 5_5 having the device arrangement surface across the reinforce member 70_2 corresponds to a specific surface. A wider pseudo waveguide space S24 is located in a direction in which the inside member 80_14 is located when viewed from the edge devices 4_2 and 4_5.

Thereby, in the present modification example, radio wave propagates in the pseudo waveguide spaces S17 and S18 and in the wider pseudo waveguide spaces S23 and S24.

Figure 24:
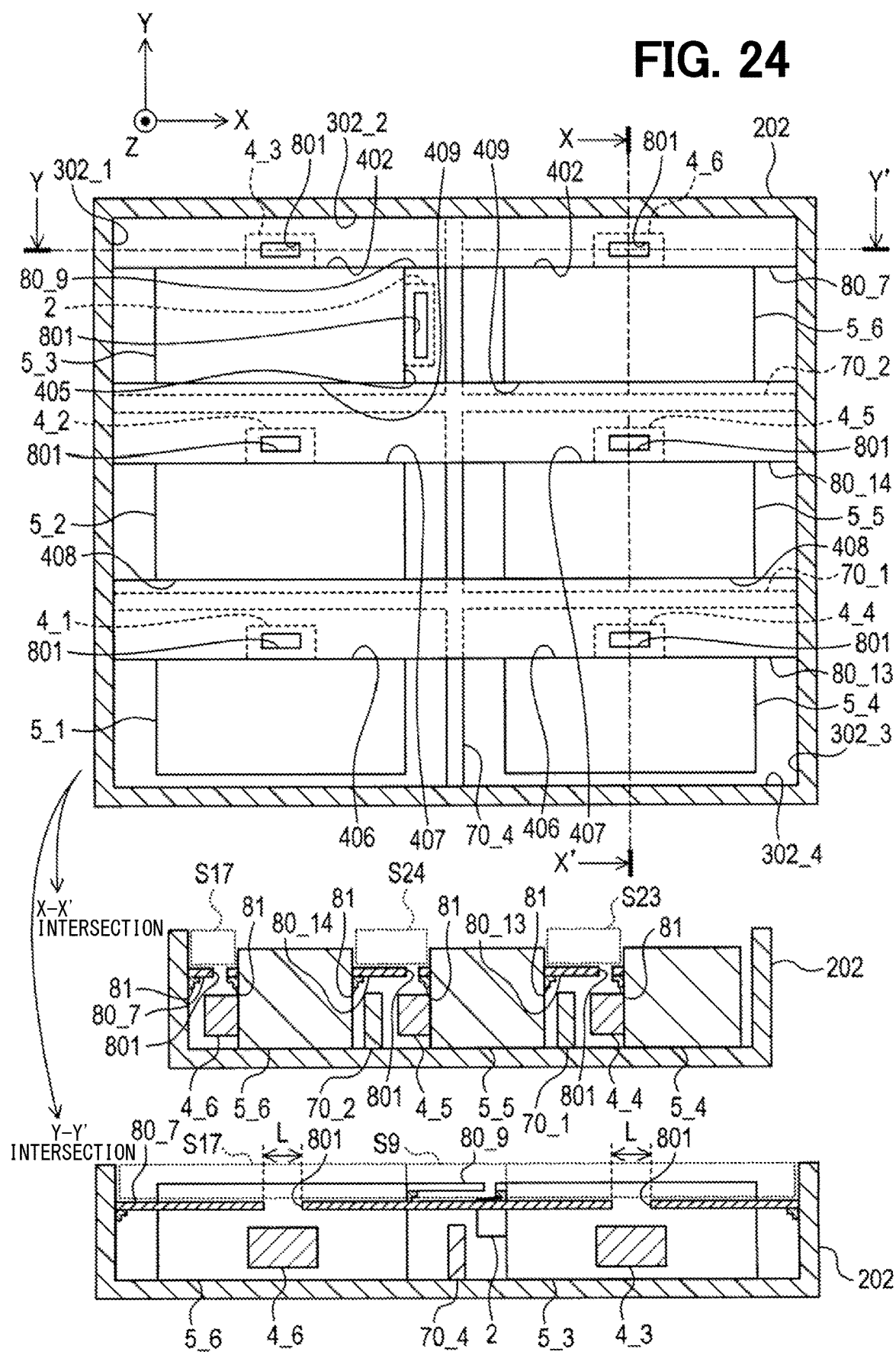
FIG. 24 is an explanatory diagram illustrating Modification Example 3-3.

(3-3) The inside member 80_5 used in the Modification 2-4 may be replaced with an inside member 80_13, as shown in FIG. 24. Further, the inside member 80_14 may be used instead of the inside member 80_6.

Figure 25:
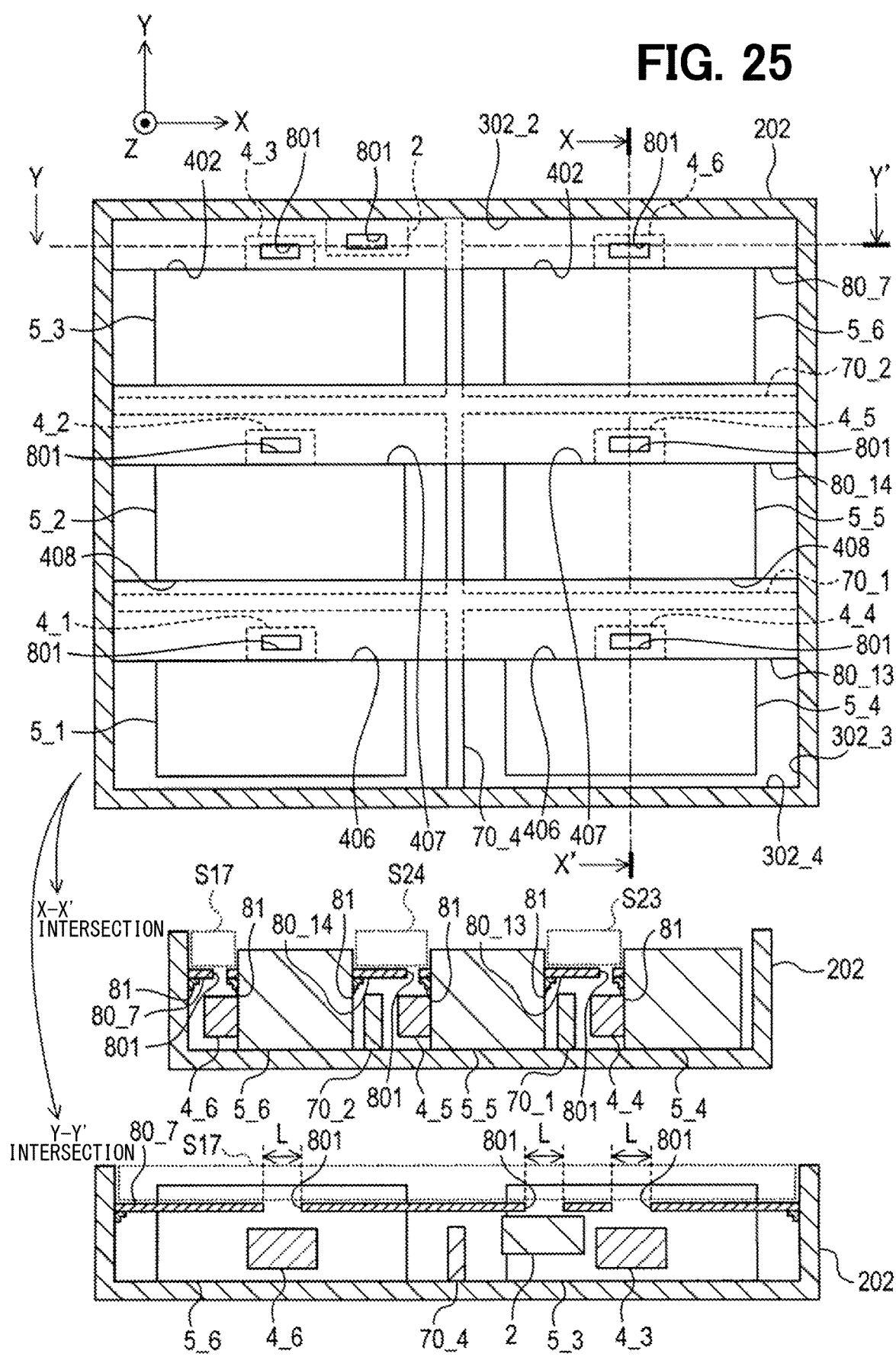
FIG. 25 is an explanatory diagram illustrating Modification Example 3-4.

(3-4) As shown in FIG. 25, the inside member 80_13 may be used instead of the inside member 80_5 used in the Modification Example 2-5. Further, the inside member 80_14 may be used instead of the inside member 80_6.

4. OTHER EMBODIMENTS

Although the embodiments of the present disclosure have been described above, the present disclosure is not limited to the embodiments described above, and various modifications may be made to implement the present disclosure.

(4a) With respect to the edge device 4, the inside member 80 may be arranged both above and below the antenna structure included in the edge device 4.

(4b) With respect to the management device 2, the inside member 80 may be arranged below the antenna structure included in the management device 2. Alternatively, the inside member 80 may be arranged both above and below the antenna structure included in the management device 2.

(4c) The housing 200 does not necessarily have to include the reinforce member 70.

(4d) The antenna 21 may be a horn antenna or may be a beamforming antenna.

(4e) In the above-described embodiment, an example in which all the edge devices 4 (i.e., the edge devices 4_1-4_3 or the edge devices 4_1-4_6) included in the communication system 100 are configured respectively as a specific communication device has been described. However, the present disclosure is not limited to the above. For example, at least one of the edge devices 4 included in the communication system 100 may be configured as a specific communication device. The specific communication device may be configured to include at least an antenna structure arranged at a position between the specific surface and the device arrangement surface, and an antenna included in the antenna structure may be configured to have directivity set in a predetermined direction range including a direction in which the opening 801 is located when viewed from the antenna structure.

(4f) Although the housing 200 is made of metal in the above-described embodiment, the housing 200 is not limited to being made of metal. For example, the housing 200 may be made of resin, may be made of both metal and resin, or may be made of material other than metal and resin. Further, although the housing 200 is formed in a rectangular parallelepiped shape in FIG. 2, the shape of the housing 200 is not limited to the above. For example, the housing 200 may have any shape other than the rectangular parallelepiped shape as long as the communication system 100 is accommodated therein. The housing 200 does not necessarily have to be sealed.

(4g) The communication system 100 may include plural management devices 2 and plural edge devices 4.

(4h) The management device 2 may be arranged at any position in the housing 200.

(4i) The plurality of communication devices included in the communication system 100 may include a first communication device that communicates with each other and a second communication device that is different from the first communication device. Namely, in other words, the first communication device does not have to be configured to receive the battery information, like the management device 2, and the second communication device does not have to be configured to acquire the battery information and transmit the battery information to the first communication device, like the edge device 4.

(4j) Plural functions of one constituent element in the above-described embodiment may also be realized by using plural constituent elements, and one function of one constituent element may also be realized by using plural constituent elements. In addition, multiple functions of multiple constituent elements may also be realized by using one constituent element, and a single function realized by multiple constituent elements may also be realized by using one constituent element. Further, a part of configuration of the above-mentioned embodiment may be omitted. Further, at least a part of the configuration of the above-described embodiment may be added or replaced with respect to the configuration of the above-described other embodiment.

What is claimed is:

1. A communication system provided in a housing, the communication system comprising:
    at least one first communication device; and
    at least one second communication device different from the first communication device, wherein
    the first communication device is configured to perform wireless communication and to receive battery information transmitted from the second communication device,
    the second communication device is configured to acquire, as the battery information, information about at least one battery cell in an assembled battery including plural battery cells, to perform wireless communication, and to transmit the battery information to the first communication device,
    at least one of the first communication device and the second communication device serving as a specific communication device includes at least an antenna structure including at least one antenna, the antenna structure arranged on an orthogonal surface orthogonal to a battery arrangement surface on which battery cells are arranged in the housing, and
    the antenna structure is installed at a position between a device arrangement surface, which is the orthogonal surface on which the specific communication device is arranged, and a specific surface, which is also the orthogonal surface different from the device arrangement surface,
    the housing has an inside member installed therein to be substantially parallel to the battery arrangement surface and at least one of above and below the antenna structure included in the specific communication device, on condition that above and below indicates a vertical direction orthogonal to the battery arrangement surface,
    the inside member has, formed thereon, at least one opening that opens in the vertical direction, and
    the antenna included in the specific communication device has directivity set in a predetermined direction range including at least a direction in which the opening of the inside member is located.

2. The communication system of claim 1, wherein the inside member is configured to fix the device arrangement surface and the specific surface.

3. The communication system of claim 1, wherein the specific communication device is at least one second communication device.

4. The communication system of claim 3, wherein the antenna included in the second communication device has directivity set in a predetermined direction range including (i) a direction in which the opening of the inside member is located and (ii) a direction in which the first communication device is located.

5. The communication system of claim 1, wherein a length of a longest part of the opening is one fourth or more of a wavelength of radio wave used in the communication system.

6. The communication system of claim 1, wherein at least one device arrangement surface is one of plural orthogonal surfaces provided in the battery cell.

7. The communication system of claim 6, wherein at least one of the specific surfaces is an inner peripheral wall surface of the housing.

8. The communication system of claim 6, wherein the housing includes a reinforce member that connects the inner wall surfaces facing each other,
the reinforce member includes the orthogonal surface, and
at least one of the specific surfaces is the orthogonal surface provided in the reinforce member.

9. A first communication device of a communication system provided in a housing and including: at least one first communication device; and at least one second communication device different from the first communication device, the first communication device being configured to perform wireless communication and to receive battery information transmitted from the second communication device, and the second communication device being configured to acquire, as the battery information, information about at least one battery cell in an assembled battery including plural battery cells, to perform wireless communication, and to transmit the battery information to the first communication device, the first communication device comprising:
   an antenna structure including at least one antenna, the antenna structure arranged on an orthogonal surface orthogonal to a battery arrangement surface on which battery cells are arranged in the housing, wherein
   the antenna structure is installed at a position between a device arrangement surface, which is the orthogonal surface on which the first communication device is arranged, and a specific surface, which is also the orthogonal surface different from the device arrangement surface,
   the housing has an inside member installed therein to be substantially parallel to the battery arrangement surface and at least one of above and below the antenna structure included in the first communication device, on condition that above and below indicates a vertical direction orthogonal to the battery arrangement surface,
   the inside member has, formed thereon, at least one opening that opens in the vertical direction, and
   the antenna included in the first communication device has directivity set in a predetermined direction range including at least a direction in which the opening of the inside member is located.

10. A second communication device of a communication system provided in a housing and including: at least one first communication device; and at least one second communication device different from the first communication device, the first communication device being configured to perform wireless communication and to receive battery information transmitted from the second communication device, and the second communication device being configured to acquire, as the battery information, information about at least one battery cell in an assembled battery including plural battery cells, to perform wireless communication, and to transmit the battery information to the first communication device, the second communication device comprising:
   an antenna structure including at least one antenna, the antenna structure arranged on an orthogonal surface orthogonal to a battery arrangement surface on which battery cells are arranged in the housing, wherein
   the antenna structure is installed at a position between a device arrangement surface, which is the orthogonal surface on which the second communication device is arranged, and a specific surface, which is also the orthogonal surface different from the device arrangement surface,
   the housing has an inside member installed therein to be substantially parallel to the battery arrangement surface and at least one of above and below the antenna structure included in the second communication device, on condition that above and below indicates a vertical direction orthogonal to the battery arrangement surface,
   the inside member has, formed thereon, at least one opening that opens in the vertical direction, and
   the antenna included in the second communication device has directivity set in a predetermined direction range including at least a direction in which the opening of the inside member is located.

11. A communication device comprising:
   a management device;
   a first battery module including: a first antenna, a first edge device, and a first battery cell; and
   a housing including: a lid portion, a bottom portion, and an inside member, and wherein:
   the management device includes: a management module, and a management antenna;
   the lid portion includes an underside surface;
   the bottom portion includes: a horizontal battery arrangement surface configured to support the first battery cell, and a vertical inner peripheral wall facing the first antenna;
   the first battery cell includes a front surface facing forwards;
   the first antenna is mounted directly or indirectly on the front surface, and is located between the front surface and the vertical inner peripheral wall;
   the inside member is horizontally mounted above or below the first antenna, and includes a first opening;
   the first opening at least partially overlaps the first antenna in a vertical view;
   a pseudo waveguide space is substantially defined by: a horizontal surface of the inside member, a portion of the front surface, a portion of the vertical inner peripheral wall, and either (i) a portion of the horizontal battery arrangement surface, or (ii) a portion of the underside surface; and
   the pseudo waveguide space is configured to pass radio waves from the first antenna towards the management antenna.

12. The communication device of claim 11, further comprising:
   a second battery module that: includes a second antenna, is located leftwards of the first battery module, and is substantially identical to the first battery module, wherein
   the inside member includes a second opening located above the second antenna;
   the management module is located leftward of the second battery module.

13. The communication device of claim 12,
wherein the management device is located above the inside member, and is located at least partially in the pseudo waveguide space; and wherein the inside member extends from the front surface to the vertical inner peripheral wall.

14. The communication device of claim 11, wherein:

the radio waves have a characteristic wavelength;

the first opening includes a longest length such that: (characteristic wavelength/4)≤longest length<characteristic wavelength;

the first antenna is configured to transmit the radio waves in a non-vertical direction that is deviated from the vertical towards the management device; and the non-vertical direction is coaxial with a central axis of the transmitted radio waves.

15. The communication device of claim 14, wherein the first opening is located such that the non-vertical direction passes through a center of the first opening.

16. The communication device of claim 11, further comprising:

an additional inside member partially defining an additional pseudo waveguide space;

a second battery module including a second edge device;

a third battery module including a third edge device;

a fourth battery module including a fourth edge device;

a fifth battery module including a fifth edge device; and a sixth battery module including a sixth edge device, wherein the first, second, and third edge devices are configured to communicate with the pseudo waveguide space through openings in the inside member; and the fourth, fifth, and sixth edge devices are configured to communicate with the additional pseudo waveguide space though additional openings in the additional inside member.

* * * * *